(12) United States Patent
Cohen et al.

(10) Patent No.: US 11,062,454 B1
(45) Date of Patent: Jul. 13, 2021

(54) MULTI-MODAL SENSOR DATA ASSOCIATION ARCHITECTURE

(71) Applicant: Zoox, Inc., Foster City, CA (US)

(72) Inventors: Joshua Kriser Cohen, Sunnyvale, CA (US); Balazs Kovacs, Foster City, CA (US); Sabeek Mani Pradhan, Redwood City, CA (US); Cooper Stokes Sloan, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 24 days.

(21) Appl. No.: 16/386,249

(22) Filed: Apr. 16, 2019

(51) Int. Cl.
G06N 3/08 (2006.01)
G06T 7/11 (2017.01)
G06K 9/32 (2006.01)
G01S 17/89 (2020.01)
G06N 20/20 (2019.01)

(52) U.S. Cl.
CPC ............. *G06T 7/11* (2017.01); *G01S 17/89* (2013.01); *G06K 9/3233* (2013.01); *G06N 3/08* (2013.01); *G06N 20/20* (2019.01); *G06T 2207/10028* (2013.01)

(58) Field of Classification Search
CPC ................................. G06T 7/11; G06N 20/20
See application file for complete search history.

(56) References Cited

U.S. PATENT DOCUMENTS

2019/0258878 A1\* 8/2019 Koivisto .................. G05D 1/00
2020/0143238 A1\* 5/2020 Ramnath ............ G06K 9/00677
2020/0151512 A1\* 5/2020 Corral-Soto ......... G06K 9/6262

\* cited by examiner

*Primary Examiner* — Tuan H Nguyen
(74) *Attorney, Agent, or Firm* — Lee & Hayes, P.C.

(57) ABSTRACT

A machine-learning architecture may be trained to determine point cloud data associated with different types of sensors with an object detected in an image and/or generate a three-dimensional region of interest (ROI) associated with the object. In some examples, the point cloud data may be associated with sensors such as, for example, a lidar device, radar device, etc.

24 Claims, 6 Drawing Sheets

MULTI-MODAL SENSOR DATA ASSOCIATION ARCHITECTURE

BACKGROUND

Computer vision is used in numerous applications, such as operating autonomous vehicles, identifying individuals for security purposes, etc. Computer vision techniques may include building software components that identify salient portions from an image, representing the salient portions of the image to the computer in a form that the computer can use to conduct further operations, and/or tracking objects. However, monocular images traditionally include two-dimensions of spatial data. Therefore, even when object detection is conducted on an image of a scene, this detection provides no more than the coordinates of the image that correspond to the detected object (i.e., depth and/or scale is ambiguous). Solutions, such as using stereo cameras, have been introduced to recover the depth of a detected object from an image. However, stereo camera depth detection is error-prone and is often too slow for real-time applications, such as autonomous vehicle control, which could lead to reduced safety outcomes.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
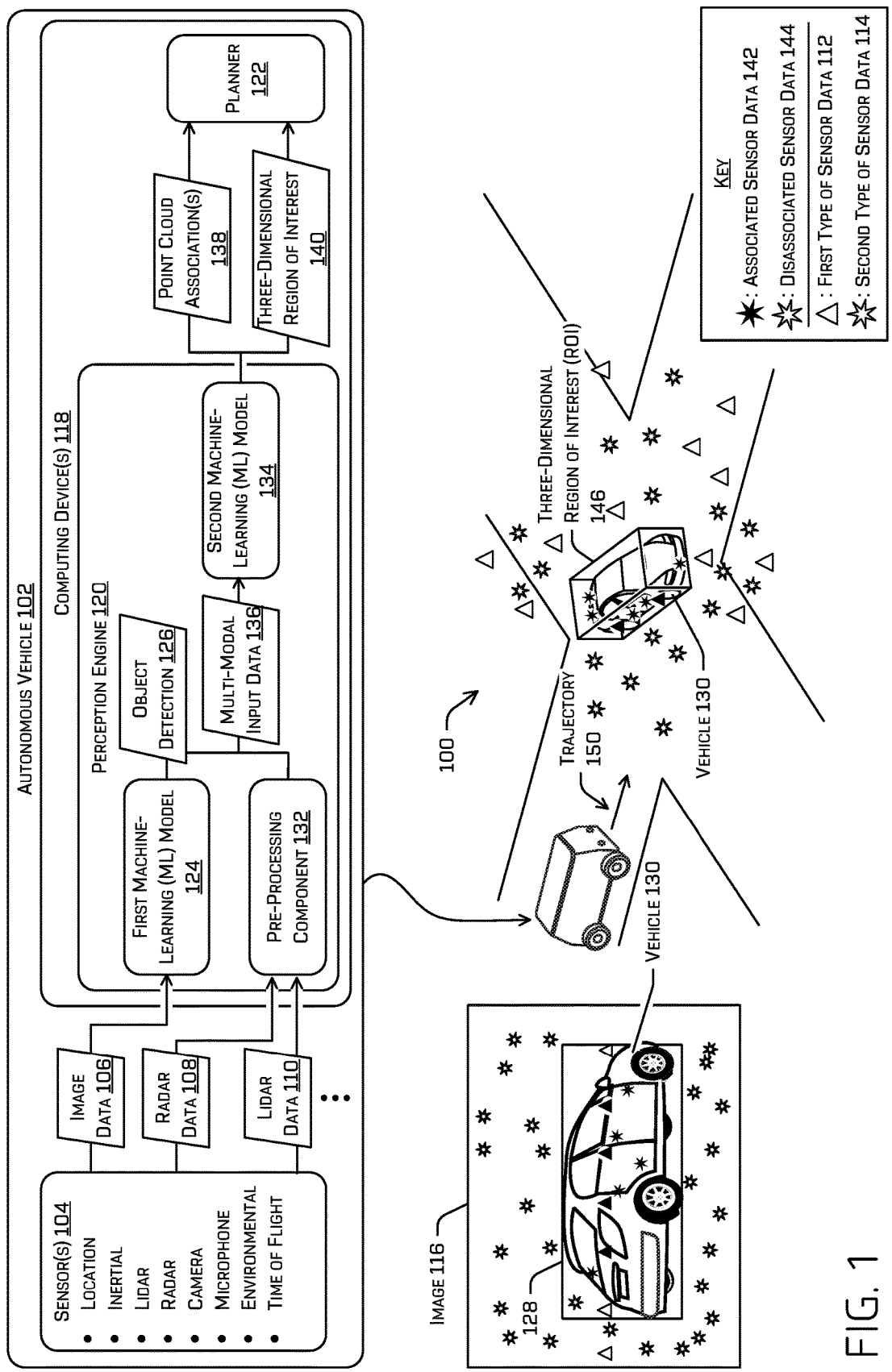
FIG. 1 illustrates an example scenario depicting an autonomous vehicle detecting an object in an environment surrounding the autonomous vehicle including generating an object detection based on image data, point cloud data from a lidar device, and/or radar device, and/or a three-dimensional region of interest (ROI) to associate with the object detection.

The techniques discussed herein relate to detecting an object in an environment and/or generating a three-dimensional region of interest (ROI) associated with such an object detection based on a plurality of sensor modalities. Whereas some computer vision techniques output a two-dimensional location of an object in an image, the techniques discussed herein improve former techniques by associating the object detection in the image with three-dimensional data associated with the space occupied by the object in an environment and/or a three-dimensional ROI that identifies the object's location in the environment. The techniques may comprise a machine-learning (ML) model configured to use sensor data from multiple types of sensors, thereby increasing the accuracy of the point cloud/object detection associations relative to techniques that rely on one modality of sensor, such as lidar data, for example. The techniques discussed herein can be used to obtain segmentation of point cloud data associated with any sensor data type from which a point cloud may be generated.

The techniques discussed herein may include determining what portion of point cloud data received from different types of sensors to associate with a region in a monocular image (i.e., an image that does not include depth, also referred to herein as "z-axis" information) detected as representing an object in an environment surrounding the sensors. The techniques may comprise receiving an indication that at least a portion of an image object represents an object (an "object detection") and determining what portions of one or more point clouds are associated with that object. For example, a point cloud may be generated from depth measurements taken by one or more radar sensors, lidar sensors, time of flight (ToF) sensors, and/or the like. Point clouds are not easily associated with image data, since a point of a point cloud may not actually be associated with a surface of the object and may actually lie in front of or beyond the object. (e.g., due to a transmission signal of the sensor passing through or around the object due to a frequency and/or power of the transmission and/or a corresponding attenuation of material(s) of the object).

Therefore, merely projecting three-dimensional points from a lidar coordinate space, for example and without limitation, into the portion of an image space corresponding to the object detection and associating those projected lidar points that join the ROI may result in falsely associating lidar points with the object. Although some of the points may correctly be associated with the object, this method may result in wrongly associating lidar points with the image that are in fact attributable to surfaces of occluding objects, surfaces surrounding the object, and/or surfaces of objects occluded by the object.

The techniques discussed herein may employ a machine-learning (ML) architecture that is configured to receive an object detection (e.g., based on image data) and point cloud data from different types of sensors and determine a subset of the point cloud data to associate with the object detection and/or generate a three-dimensional ROI indicating a volume occupied by the object in space. Determining the subset of the point cloud data may comprise generating a point in/out map (for each sensor modality, in some examples) that associates each point of the point cloud with a probability that the point is associated with the object indicated by the object detection. The point in/out map indicate a probability and/or an indication (e.g., a binary value) that a point is or is not associated with an object associated with the object detection. The binary indication may be based at least in part on a probability threshold. For example, an indication that a point is associated with the object may be based at least in part on a probability associated with the point meeting or exceeding a probability threshold, whereas an indication that the point is not associated with the object may be based at least in part on the probability being less than the probability threshold.

In some examples, the ML architecture may be configured to receive at least two point clouds, where each point cloud is associated with a different type of sensor (e.g., one point cloud associated with data from one or more lidar sensors and one point cloud associated with one or more radar sensors). In some examples, image data and/or an image-based object detection may additionally or alternatively be provided as input the ML architecture. The point cloud associated with each sensor type may be generated from outputs of one or more sensors of that type (e.g., a point cloud may be generated for lidar data based on signal(s) received from one or more lidar sensors). In at least one example, the ML architecture discussed herein may be trained on at least image data, lidar data, and radar data.

In an example where two different types of sensors are employed (regardless of the number of sensors of a particular type), the ML architecture may be configured to receive first sensor data associated with a first type of sensor and second sensor data associated with a second type of sensor, and to output a first point in/out map associated with the first sensor data and a second point in/out map associated with the second sensor data. The point in/out maps may indicate a likelihood of whether each point in the respective types of sensor data is associated with an object represented by the object detection. For example, the first sensor data may comprise a first point associated with a radar depth measurement and the second sensor data may comprise a second point associated with a lidar depth measurement. The first point in/out map may comprise a first probability associated with the first point that indicates a likelihood that the first point is associated with an object indicated by an object detection and/or a binary indication that the first point is or isn't associated with the object. Similarly, the second map may comprise a second probability associated with the second point that indicates a likelihood that the second point is associated with the object and/or a binary indication that the second point is or isn't associated with the object. In some examples, the techniques may comprise associating a particular point of a point cloud with an object detection based at least in part on determining that a probability associated with the particular point meets or exceeds a threshold probability.

The ML model architecture may be configured to generate a point in/out map associated with a first type of sensor data based at least in part on one or more types of sensor data. In other words, the ML model architecture may be configured to generate a point in/out map for lidar data using lidar data and radar data, although determining the point in/out map based on just the first type of sensor data is contemplated. This means that a probability in the point in/out map that indicates a likelihood that a lidar point is associated with the object/object detection may be determined by the ML model using lidar data and radar data and/or other types of sensor data that may be represented as a point cloud. It is also contemplated that the ML model architecture may be configured to determine a point in/out map for a respective type of sensor data using any combination of sensor data, including determining the point in/out map using sensor data of just the type of sensor data for which the point in/out map is determined (i.e., determining a point in/out map for the lidar data based on the lidar data) and/or additionally any other sensor data that is available (e.g., ToF sensor data, radar data).

Although the discussion herein predominantly discusses two types of sensor data, it is contemplated that the techniques may apply to three or more sensor data types. However, solely for the sake of simplicity and clarity, the ML model discussed herein receives two sensor data types. In an additional or alternate example, the ML model discussed herein (or another ML model) may determine a three-dimensional ROI to associate with the object/object detection that is based at least in part on a point in/out map associated with lidar sensor data. The three-dimensional ROI may comprise a center, extent, and/or orientation (e.g., a yaw, pitch, roll) that indicates an estimated volume occupied by the object.

The techniques discussed herein may increase the amount of data made available to a planner component that controls a machine, such as an autonomous vehicle, based at least in part on the point in/out map(s) and/or three-dimensional ROI. For example, the ML architecture may output an instance segmentation (e.g., a segmentation of points which provides a unique identification for each detected object) for radar points, which other ML architectures do not do. Additionally or alternatively, the planner (or a component of a perception engine) may determine whether to associate any of a number of different kinds of sensor data with an object detection associated with an image. In some examples, the perception engine may determine a track in association with an object detection, where the track may comprise a current, predicted, and/or historical position, heading, velocity, acceleration, distance, ROI(s), and/or center of the object, as represented in image. The track may be extended to include current, predicted, and/or historical point cloud data based at least in part on the subset of points of one or more point clouds (as identified by or based on the point in/out map(s)) and/or the three-dimensional ROI output by the ML architecture discussed herein.

Moreover, the ML architecture discussed herein may improve the recall and/or accuracy of associating point cloud data points with objects more than 50 meters from the sensor and, more generally, may improve the accuracy of associating the correct point cloud points with an object detection. In examples where an autonomous vehicle incorporates the techniques discussed herein, this increase in recall and/or accuracy at greater distances may enable the autonomous vehicle to travel at higher speeds safely (e.g., on a highway). The association of the point cloud data with the image-based object detection may additionally or alternatively increase the accuracy of the track and/or components thereof, such as the heading, velocity, and/or acceleration of an object.

The techniques discussed herein may improve the safety of system(s) that integrate the techniques discussed herein. For example, by implementing the techniques discussed herein as a sub-system of an autonomous vehicle, the autonomous vehicle may operate more safely and/or efficiently. The techniques may comprise controlling operation of the autonomous vehicle based at least in part on the point in/out map(s) and/or three-dimensional ROI output by the ML architecture discussed herein.

Example Scenario

FIG. 1 illustrates an example scenario 100 including an autonomous vehicle 102 that detects an object in an environment surrounding the autonomous vehicle from sensor data collected by one or more sensors (sensor(s) 104) of the autonomous vehicle 102. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to video games, manufacturing, augmented reality, etc.

According to the techniques discussed herein, the autonomous vehicle 102 may receive sensor data from sensor(s) 104 of the autonomous vehicle 102. For example, the sensor data may include a location signal (e.g., a GPS signal), an inertia signal (e.g., an accelerometer signal, a gyroscope signal, etc.), a magnetometer signal, a wheel encoder signal, a speedometer signal, point cloud(s) of accumulated lidar, radar, ToF, depth camera, and/or other depth-sensing sensor points, an image (or images), an audio signal, and/or bariatric and/or other environmental signals, etc.

In at least one example, the sensor data may comprise at least image data 106 and data that may be represented as a point cloud, which may be received from one or more types of sensors. For example, sensor data that may be represented as a point cloud may include radar data 108, lidar data 110, and/or any other sensor data from which a point cloud may be constructed, such as ToF data, stereo camera data, etc. Sensors from which point clouds may be generated may be configured to measure a depth from the sensor to a surface and/or infer such a depth, as in the case of stereo cameras. A point of a point cloud may be a three (or more)-dimensional point that corresponds to a discrete location in the environment surrounding the autonomous vehicle. Points of the point cloud may be represented using any of a variety of coordinate systems (e.g., Euclidean, polar, spherical, cylindrical). However, it is contemplated that a point of the point cloud may comprise less than three dimensions in some instances (e.g., where one dimension is assumed, a two-dimensional plane is being scanned for objects).

FIG. 1 illustrates a first point cloud of a first type of sensor data 112 (e.g., radar data 108) represented as triangles, a second point cloud of a second type of sensor data 114 (e.g. lidar data 110) represented as stars, and an image 116 that is an example of image data 106. In some examples, a point cloud may comprise between one and thousands or even hundreds of thousands of points, therefore it is understood that the illustrated point clouds are merely a small portion of the potential number of points that may be received from sensor(s) 104. In an additional or alternate example, sensor data received from different sensor types may be combined into a single point cloud.

In some examples, the autonomous vehicle 102 may include computing device(s) 118 that may include a perception engine 120 and/or a planner 122. In general, the perception engine 120 may determine what is in the environment surrounding the autonomous vehicle 102 and the planner 122 may determine how to operate the autonomous vehicle 102 according to information received from the perception engine 120 regarding the environment. The perception engine 120 may include one or more ML models and/or other computer-executable instructions for detecting, identifying, segmenting, classifying, and/or tracking objects from sensor data collected from the environment of the autonomous vehicle 102. For example, the perception engine 120 may comprise the ML architecture discussed herein for determining a subset of point cloud points and/or three-dimensional ROI to associate with an object detection.

The ML models discussed herein may include a neural network, such as a random forest and/or boosted ensemble of decision trees; a directed acyclic graph (DAG) (e.g., where the nodes are organized as a Bayesian network); deep learning algorithm(s), such as artificial neural networks (ANN), recurrent neural network (RNN), residual neural network (ResNet)), deep belief network (DBN), deep stacking network (DSN); etc.

In some examples, a first ML model 124 of the perception engine 120 may be trained to receive sensor data from sensor(s) 104 of the autonomous vehicle 102 and output an object detection 126 for any objects in the environment that correspond with classification for which the first ML model 124 has been trained. For example, the first ML model 124 may be a computer vision component that detects objects from image data 106 and outputs the object detection 126 to identify a representation of the object within an image and/or the object's relation to the autonomous vehicle (e.g., a spatial relation). In some examples, the object detection 126 may comprise an ROI associated with the object's representation in an image (e.g., a rectangle encompassing the representation of the object in the image comprising a center, extent, and/or orientation (e.g., a yaw in some examples, and/or a roll and/or pitch); a mask identifying salient pixels or other portions of the image associated with the object), a classification associated with the object (e.g., pedestrian, vehicle, cyclist, traffic signage, blocking vehicle), a depth estimate and/or depth probability distribution associated with the ROI, a segmentation associated with the representation of the object in an image (e.g., a semantic segmentation), and/or any other computer vision information related to the representation of the object in an image and/or the spatial data about the object that may be inferred from the image.

In the illustrated example, the first ML model 124 may receive image 116 and generate ROI 128 as part of an object detection 126 associated with vehicle 130.

In some examples, the first ML model 124 may additionally or alternatively determine a track of the object. In some examples, the track may associate a current detected position of an object and a previously detected position of an object and/or a current, predicted, and/or historical position, heading, velocity, acceleration, distance, ROI(s), and/or center of the object. The track may thereby be an indication that the first ML model 124 is identifying two object detections as corresponding to a same object.

In some examples, the perception engine 120 may additionally or alternatively comprise a pre-processing component 132 that receives sensor data from the sensor(s) 104. In some examples, the pre-processing component 132 may comprise software and/or hardware that receives signal(s) from depth-sensing sensors such as, for example, a radar sensor, lidar sensor, and/or other type of depth sensor. Generally, the pre-processing component 132 may be configured to preliminarily generate point clouds from signals received from the depth sensors, determine a subset of the point clouds to associate with each object detection 126 generated by the first ML model 124, and/or translate coordinates of the subset from a sensor coordinate space to an image space and/or a modified image space where a "z-axis" of the image space extends through a center of an ROI of the object detection and the "x-" and "y-" axes. These subsets may be provided to a second ML model 134 as part of multi-modal input data 136. The second ML model 134 comprises the ML architecture discussed herein. Where the second ML model 134 is configured to receive m number of types of point cloud data and the first ML model 124 outputs n object detections, where m and n are positive integers, pre-processing component 132 may be configured to output m subsets of point cloud data per object detection, resulting in a total number of m·n outputs in at least one example. Other configurations are contemplated where the output subsets may be aggregated together and/or the total number of outputs may be (m+1)n where the spatial data of different types of sensor data is aggregated together and forms a first input and the non-spatial data of the different sensor types forms m inputs. For example, for each object detection, an accumulated point cloud comprising lidar and radar points may be provided as a first input, non-spatial lidar and/or image data may be provided as a second input, and/or non-spatial radar and/or image data may be provided as a third input to second ML model 134.

In some instances, the signal received at the pre-processing component 132 from a type of sensor may comprise a signal from one or more sensors. For example, the autonomous vehicle 102 may include multiple lidar sensors, one or more of which that may provide a signal to the pre-processing component 132. The pre-processing component 132 may generate a point cloud in association with each type of sensor. In some examples, the pre-processing component 132 may combine the point clouds of different types of sensors into a single point cloud, although in other examples, the pre-processing component 132 may separate and/or identify points of a point cloud according to sensor type.

In some examples, generating a point cloud may be based at least in part on depth measurements received from one or more sensors, where an individual point in the point cloud represents a discrete location in the environment surveyed by the sensor. In some examples, an individual point of a point cloud may be represented as a point in a Euclidean, polar, spherical, etc. space representing the environment surrounding the sensor or towards which a sensor was oriented at the time a measurement was taken, whereas an ROI may comprise a bounding box that comprises a center, extent, offsets, and/or orientation in an image space.

In some examples, radar data may be two-dimensional—radar data may indicate a scanning angle (i.e., an azimuth) and a depth, but lack a "height" (i.e., an altitude). To generate a three-dimensional point for use by the ML architecture discussed herein, the pre-processing component 132 may receive an object detection 126 from the first ML model 124 (and/or retrieve the object detection 126 from memory), translate the scanning angle of the radar data into a horizontal value in image space (e.g., an "x" value in Euclidean space), and determining a subset of radar data having horizontal values that intersect the object detection. The pre-processing component 132 may set a vertical value (e.g., a "y" value in Euclidean space) of the translated radar data to equal a vertical value of a center of the object detection (e.g., a center indicated by an ROI), although it is contemplated that any other point in the object detection may be used so long as the point used is consistent. In some instances, where multiple objects are detected in an image and the pre-processing component 132 therefore receives multiple object detections, it is possible that a radar point may be included in different subsets provided to the second ML model 134 and/or the radar point may have a different vertical value for each object detection 126 associated therewith. The training of the second ML model 134 configures the second ML model 134 to disambiguate the appropriate object with which to associate such a radar point, so redundantly including the radar point, but with different vertical values between two subsets, doesn't create an issue.

In some examples, the pre-processing component 132 may identify a subset of point cloud points to provide to the second ML model 134 based at least in part on projecting the point cloud into an image space associated with the image (e.g., projecting lidar points and/or radar points into image coordinates), or otherwise selecting the points which fall inside the bounds of the detected object (thereby removing the necessity to project onto an image plane). This may include projecting three-dimensional points into two-dimensional projected points (i.e., projections). The pre-processing component 132 may identify, as the subset, the points of the point cloud that correspond to projections thereof that lie within the extents of the object detection (e.g., the points corresponding to projections that lie within an ROI).

Once subsets of point clouds have been associated with an object detection 126, the subsets and the object detection 126 may be provided as input to the second ML model 134 as part of the multi-modal input data 136. In some examples, the subsets provided as input to the second ML model 134 may be translated into coordinates of a modified image space comprising three dimensions (e.g., a Euclidean space), where two dimensions correspond to pixels of the object detection and a third dimension corresponds to depth (e.g., a "z-axis"). In some examples, the modified image space may be defined to have an origin at the image sensor and have a "z-axis" that extends through a center of an ROI of the object detection. In some examples, coordinates of a point of a subset may be translated from the space in which the sensor represented the points (and/or the pre-processor represented the points) to the modified image space. For example, the point cloud sensor space may indicate points in a point cloud by coordinates relative to a space having an origin defined at the sensor, whereas translating those coordinates into the modified image space may represent the points relative to the space as defined above (e.g., having an origin at the image sensor, "x-axis" and/or "y-axis" oriented to lie orthogonally to an orientation of pixels of the image and/or orthogonally to a two-dimensional ROI, and/or a "z-axis" that extends through a center of a two-dimensional ROI associated with the object detection.

In some examples, the second ML model 134 may comprise a pipeline per type of point cloud sensor type. So, where in an example where the second ML model 134 is trained to associated lidar and radar data with an object detection, the second ML model 134 may comprise two pipelines. In such an example, each pipeline may receive spatial and/or non-spatial data associated with the respective sensor type. In an additional or alternate example, the second ML model 134 may comprise one pipeline for combined spatial data (e.g., an accumulated point cloud of all the depth sensors' data, so both lidar and radar points in the example above) plus one pipeline per sensor type to handle each sensor's non-spatial data (e.g., radar cross section (RCS), doppler, doppler variance, SNR, and/or range top-down segmentation box, semantic segmentation, instance segmentation, object classification associated with the object detection and/or a pixel thereof, and/or ROI orientation (e.g., yaw)). The multi-modal input data 136 may additionally or alternatively comprise non-spatial information. This is discussed in more detail below regarding the inputs to the second ML model 134.

The second ML model 134 may be trained to output, in association with object detection 126, point cloud association(s) 138 and/or a three-dimensional ROI 140. The point cloud association(s) 138 identify a subset of point cloud data that is attributable to the object/object detection 126 for each type of depth-sensing sensor for which the second ML model 134 is trained.

In the depicted example, a point cloud association may have been generated in association with ROI 218. Sensor data that is identified by the point cloud association as being associated with the vehicle 130 is shaded (142), whereas sensor data that is not identified by the point cloud association as being associated with the vehicle remains unshaded (144). In some examples, the perception engine 120 may determine whether to associate sensor data with an object detection based at least in part on a probability associated with the point meeting or exceeding a threshold probability. Moreover, the depiction also includes a three-dimensional ROI 146 associated with the vehicle 130, which may be an example of three-dimensional ROI 140.

In some instances, the perception engine 120 may receive sensor data from sensor(s) 104 of the autonomous vehicle 102, determine perception data from the sensor data, and transmit the perception data, which may include the point cloud association(s) 138 and/or the three-dimensional ROI 140, to a planner 122 for use by the planner 122 to localize a position of the autonomous vehicle 102 on a global map and/or a local map, determine one or more trajectories, control motion of the autonomous vehicle 102 to traverse a path or route, and/or otherwise control operation of the autonomous vehicle 102, though any such operation may be performed in various other components (e.g., localization may be performed by a localization engine, not shown).

In some instances, the perception engine 120 may additionally or alternatively determine a position of the autonomous vehicle 102 determined by a localization engine (not pictured, which may use any sensor data to localize the autonomous vehicle 102), data related to objects in the vicinity of the autonomous vehicle 102, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception engine 120 (including the output(s) of the first ML model 124 and/or the second ML model 134) may be collectively referred to as "perception data." Once the perception engine 120 has generated perception data, the perception engine 120 may provide the perception data, including the object detection, point cloud association 138, and/or three-dimensional ROI 140, to the planner 122.

In some instances, the planner 122 may use perception data, including the object detection 126, point cloud association(s) 138, and/or three-dimensional ROI 140, to generate instructions for controlling operation of the autonomous vehicle 102. For example, the planner 122 may determine a route for the autonomous vehicle 102 from a first location to a second location; generate, substantially simultaneously, a plurality of potential trajectories for controlling motion of the autonomous vehicle 102 in accordance with a receding horizon technique (e.g., 1 micro-second, half a second) and based at least in part on an ROI and/or track to control the vehicle to traverse the route (e.g., in order to avoid any of the detected objects, as well as incorporate predictions of where such objects may be at points in the future); and select one of the potential trajectories as a trajectory 150 of the autonomous vehicle 102 that may be used to generate a drive control signal that may be transmitted to drive components of the autonomous vehicle 102. FIG. 1 depicts an example of such a trajectory 150, represented as an arrow indicating a heading, velocity, and/or acceleration, although the trajectory itself may comprise instructions for a PID controller, which may, in turn, actuate a drive system of the autonomous vehicle 102.

Example ML Architecture

Figure 2:
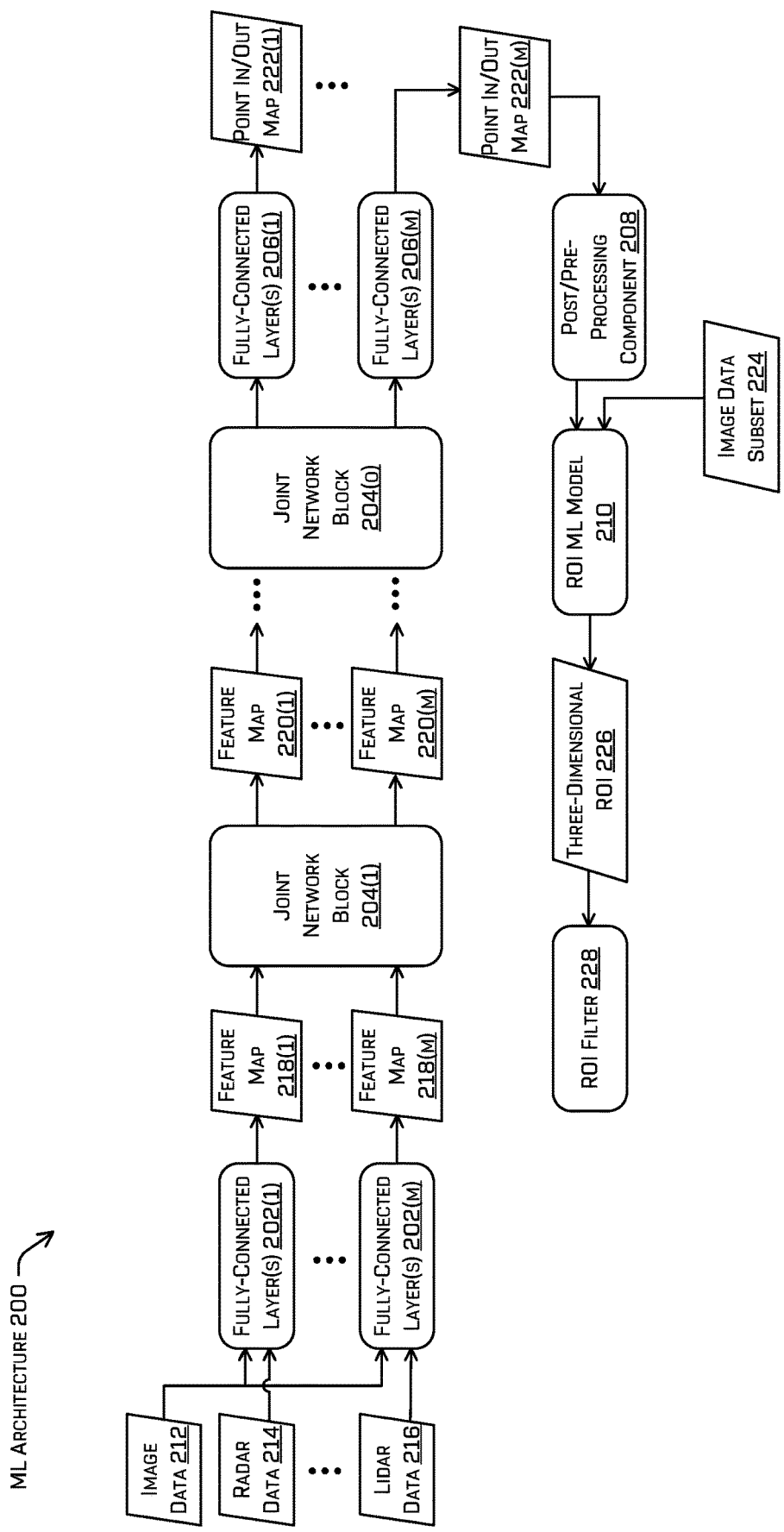
FIG. 2 illustrates a block diagram of an example architecture of a machine-learning model for determining what subset of point cloud data to associate with an object detection and/or for generating a three-dimensional ROI.

FIG. 2 illustrates additional details regarding an ML architecture 200 for determining a subset of point cloud data and/or a three-dimensional ROI to associate with an object detection. In some examples, the ML architecture 200 may comprise pre-processing component 132 and/or second ML model 134. The second ML model 134 may include an artificial neural network comprising fully-connected layer(s) 202(1)-(m), one or more joint network blocks 204(1)-(o), and a final set of fully-connected layer(s) 206(1)-(m), where m is a positive integer corresponding to a number of pipelines of the second ML model 134. In at least one example, an m-th pipeline may include fully-connected layer (s) 202(m), respective m-th components of the joint network blocks 204(1)-(o) (discussed in more detail in FIG. 3), and fully-connected layer(s) 206(m). In some examples, the respective pipelines 1-m may be separately trained per pipeline. Such separate training may include, for example, backpropagating first loss(es) for a first pipeline and m-th loss(es) for an m-th pipeline. In some examples, pipeline(s) for lidar data may additionally comprise the post/pre-processing component 208 and/or the ROI ML model 210. Note that, although the depicted example illustrates a single pipeline that processes lidar data 216, according to an additional or alternate example discussed below spatial lidar data may be processed in a first pipeline and non-spatial lidar data may be processed in a second pipeline. In an additional or alternate example, the post/pre-processing component 208 and/or the ROI ML model 210 may receive input from the lidar pipeline(s) and/or other pipeline(s).

In some examples, fully-connected layer(s) 202(1)-(m), one or more joint network blocks 204(1)-(o), fully-connected layer(s) 206(1)-(m), post/pre-processing component 208, and/or ROI ML model 210 may comprise instructions stored on a memory, hardware (e.g., application-specific integrated circuit (ASIC)), and/or some combination thereof (e.g., field-programmable gate array (FPGA)).

In some examples, the ML architecture 200 may receive sensor data and/or multi-modal input data 136 (i.e., a processed form of sensor data, as discussed above), which may comprise image data 212, such as an image and/or an object detection generated in association with an image such as object detection 126, and one or more types of point cloud data. In at least one example, the multi-modal input data 136 may comprise at least two types of point cloud data such as, for example, radar data 214 and lidar data 216. Additional or alternate types of point cloud data may be received by the ML architecture 200, such as ToF data, depth camera data, etc. In some examples, image data 212 may comprise an object detection which may comprise an ROI (e.g., a two-dimensional ROI, a bounding box, a mask), a depth probability and/or depth probability distribution associated with the ROI, a semantic segmentation associated with the representation of the object in an image, and/or any other computer vision information related to the representation of the object in an image. Such data may be generated based at least in part on an image such as, for example, a grayscale image, a red-green-blue (RGB) image, a time of flight image, a depth image, an infrared image, an image of lidar points (and/or other point cloud sensor data points) projected into a two-dimensional space, and/or any combination thereof.

In some examples, as discussed above, the multi-modal input data 136 may comprise subsets of point cloud data that are associated with an object detection. For example, for a first object detection generated by the first ML model, the multi-modal input data 136 may include a subset of point cloud data per type of point cloud sensor for which the ML architecture 200 has been trained. In some examples, the pre-processing component 132 may determine the subset of a point cloud based at least in part on projecting the point cloud into a coordinate system and/or two-dimensional space associated with the ROI of the object detection including, in the subset, those points that lie within the ROI. Such a subset may be determined per point cloud type—one for lidar, one for radar, and so on, although it is contemplated that the different types of point cloud data may be aggregated into a single point cloud. So, the multi-modal input data 136 may comprise first subset(s) of point cloud data associated with a first object detection, second subset(s) of point cloud data associated with a second (different) object detection, and so on. In at least some examples, such pre-processing may additionally, or alternatively, include translating the subset of points from a first coordinate space to a second coordinate space having an axis which runs through a center of the associated object detection in the image.

In some examples, the techniques may comprise providing, as input to the fully-connected layer(s) 202(1)-(m) of the ML architecture 200, the multi-modal input data 136. In some examples, the ML architecture 200 may comprise one pipeline (or network, subnetwork, etc.) per type of point cloud sensor data, i.e., m would equal the number of point cloud sensor types. For example, where the ML architecture 200 is trained to associate radar data 214 and lidar data 216 with an object detection, the ML architecture 200 may comprise two pipelines. In such an example, a pipeline associated with a first type of sensor may receive spatial data (e.g., the point cloud data, a monocular depth estimate associated with the object detection, and/or an ROI) and non-spatial data (e.g., data the sensor generates that identifies attributes of the sensor output, part(s) of the object detection) associated with that type of sensor. For example, where the ML architecture 200 is trained on radar data 214 and lidar data 216, the techniques may comprise training the ML architecture 200 to receive as input the following data at respective pipelines of the ML architecture 200:

Radar pipeline input: (spatial data) location (e.g., a point cloud coordinate corresponding to a radar measurement) and/or monocular depth estimate; (non-spatial data) radar cross-section (RCS), doppler, doppler variance, signal-to-noise ratio (SNR), range variance, semantic segmentation, object classification associated with the object detection (e.g., an object classification associated with one or more pixels of an ROI and/or an object classification associated with the ROI as a whole), and/or an instance label associated with one or more pixels of the ROI (e.g., an identification that a particular pixel belongs to a particular object detection).

lidar pipeline input: (spatial data) location (e.g., a point cloud coordinate corresponding to a lidar measurement), monocular depth probability, and/or top-down segmentation box; (non-spatial data) semantic segmentation, an orientation (e.g., yaw) associated with an ROI of the object detection, object classification associated with the object detection (e.g., an object classification associated with one or more pixels of an ROI and/or an object classification associated with the ROI as a whole), and/or an instance label associated with one or more pixels of the ROI (e.g., an identification that a particular pixel belongs to a particular object detection).

Note that some of the input provided to the pipeline(s) as input may be data received from a computer vision ML model such as, for example, first ML model 124 (e.g., the monocular depth probability, top-down segmentation box, semantic segmentation, ROI, ROI orientation, object classification, and/or instance label may be output(s) of the first ML model 124.

In some examples, the pre-processing component 132 may populate a tensor with a representation of the data above. In some examples, the pre-processing component 132 may populate a portion (e.g., a dimension) of the tensor with the data discussed above per point of the subset of point cloud data determined by the pre-processing component 132 in association with an object detection. It is contemplated, however, that, in some examples, the pre-processing component 132 may populate the tensor with a representation of this data over multiple points, such as by averaging, binning, and/or otherwise representing multiple points according to a sample size, N, where N is a positive integer indicating a number of point cloud points.

Note that an example of monocular depth estimation is discussed in more detail in U.S. patent application Ser. No. 15/970,838, which is incorporated in its entirety herein. An example of top-down segmentation is discussed in more detail in U.S. patent application Ser. No. 15/963,833, which is incorporated in its entirety herein.

In some examples, the point cloud data from the sensors may be aggregated into a single point cloud. In such an example, a first pipeline of the ML architecture 200 may receive the spatial data (e.g., the amalgamated point cloud), and m additional pipelines of the ML architecture 200 may receive the non-spatial data of the respective point cloud sensor types. For example, where the ML architecture 200 is trained on radar data 214 and lidar data 216, the ML architecture 200 may comprise a first pipeline that receives amalgamated lidar and radar spatial data, a second pipeline that receives lidar non-spatial data, and a third pipeline that receives radar non-spatial data.

FIG. 2 depicts the former configuration, where the ML architecture 200 comprises a pipeline for each point cloud sensor type (e.g., one for lidar data and one for radar data in the depicted example, although it is understood that the ML architecture 200 may be trained on additional or alternate sensor data types).

In some examples, a first stage of the ML architecture 200, comprising fully-connected layer(s) 202(1)-(m), receives the multi-modal input data 136. Note that stages are represented as vertically aligned components and pipelines are represented as horizontally aligned components in FIGS. 2 and 3, although it is understood that component(s) may be shared across pipelines and/or stages. Stages may be executed serially and/or in parallel. In at least one example, fully-connected layer(s) 202(m) and/or fully-connected layer(s) 206(m) may comprise one or more layers of a feed-forward artificial neural network. For example, fully-connected layer(s) 202(m) and/or fully-connected layer(s) 206(m) may comprise a multilayer perceptron. Based at least in part on the respective input received at the fully-connected layer(s) 202(1)-(m) (e.g., radar data 214 at fully-connected layer(s) 202(1), lidar data 216 at fully-connected layer(s) 202(m)), the fully-connected layer(s) 202(1)-(m) may output respective feature maps 218(1)-(m). These feature maps 218(1)-(m) may be provided, as input, to a first joint network block 204(1), which may, in turn, generate feature maps 220(1)-(m). Feature maps 220(1)-(m) may be provided as input to a subsequent joint network block and so on, until the o-th joint network block, 204(o). O may be a positive integer. In at least one example, o may be three, such that the ML architecture 200 includes three joint network blocks 204(1)-(3). In additional or alternate example, o may be one, two, four, or more.

Figure 3:
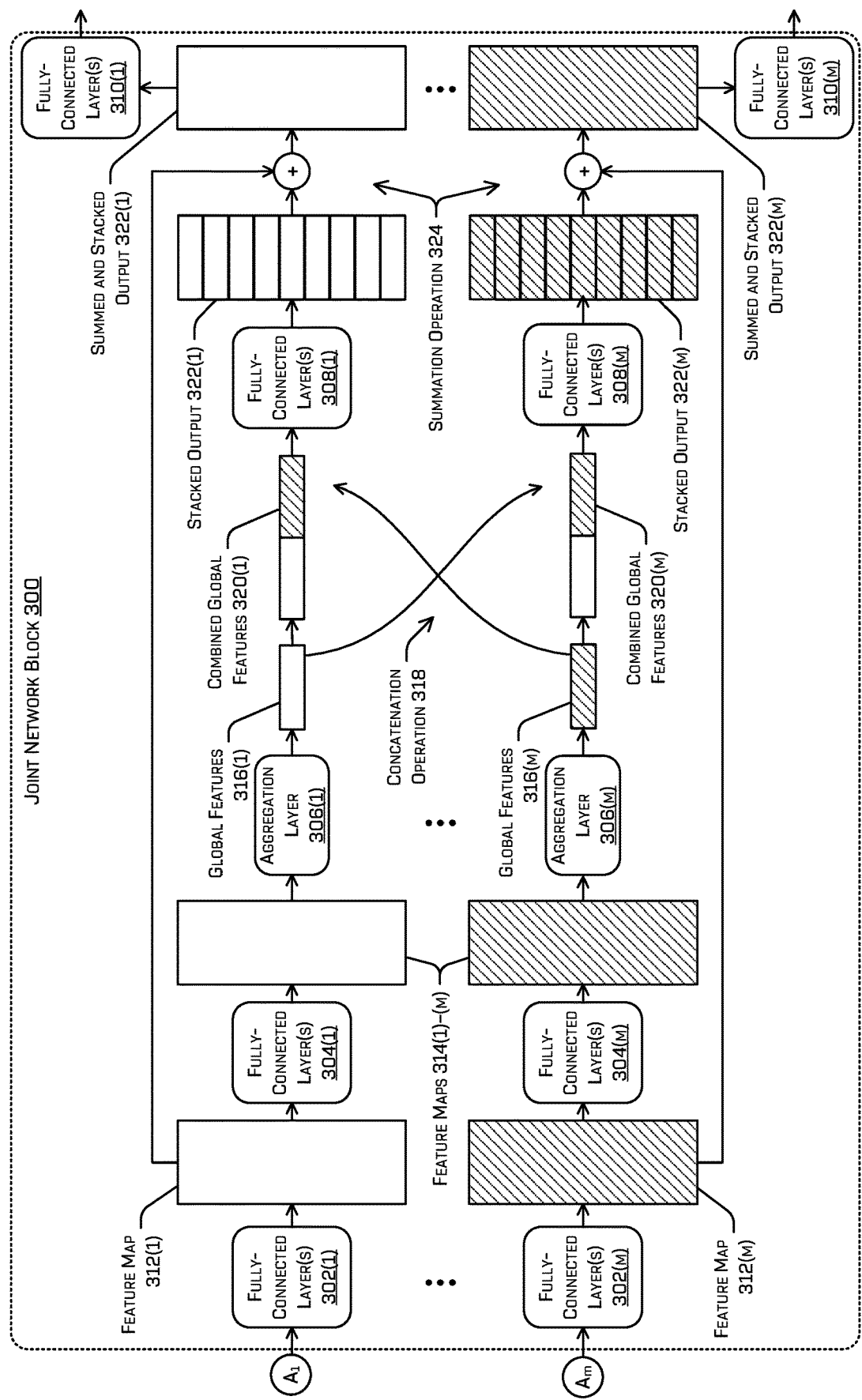
FIG. 3 illustrates a block diagram of an example architecture of a joint network block for determining point in/out maps that are based at least in part on data received from two or more sensor types.

Note that, although FIG. 2 depicts the joint network blocks 204(1)-(o) as being single components that receive, as input, the outputs of pipelines 1-(m), this was done merely because there isn't enough space to illustrate the details of the joint network blocks. In some examples, the joint network blocks may comprise components in a pipeline structure similarly to pipelines 1-(m). FIG. 3 illustrates that the joint network blocks may have a corresponding number of pipelines, although, in other examples, the joint network blocks may comprise more or less pipelines as the ML architecture 200.

Output(s) of the o-th joint network block 204(o) may be provided, as input, to a final set of fully-connected layer(s) 206(1)-(m), which may output respective feature maps. In some examples, these respective feature maps may be point in/out map(s) 222(1)-(m) where a location in a point in/out map 222(m) indicates a probability that a point of the corresponding subset of point cloud data provided to the m-th pipeline is associated with the object identified by the object detection associated with the subset. In an additional or alternate example, the point in/out map 222(m) may include an indication that a point of the corresponding subset of point cloud data provided to the m-th pipeline is "in" or "out"—i.e., whether the point is associated with the object or not. In some examples, a point may be indicated as being associated with the object if a probability identified by the feature map generated by the last fully-connected layer(s) 206(m) and associated with the point meets or exceeds a probability threshold or indicated as not being associated with the object if the probability is less than the probability threshold. In an additional or alternate example, the indication may comprise a non-binary indication such as, for example, a measure (probability, certainty, distance, etc.) that the point corresponds to the detected object or not. In some examples, a subsequent component, such as a component of the perception engine or the planner, may associate those points that are "in" with the object detection and discard and/or otherwise suppress association of any remaining points of the subset with the object detection. In at least some examples, such further components may rely on both the determination that the point is in, as well as the corresponding measure, for various operations.

In the depicted example, the first pipeline may process radar data, therefore point in/out map 222(1) may comprise a probability that a point of a subset of radar point cloud (determined by the pre-processing component 132 as being associated with an object detection) is or is not associated with the object identified by the object detection and/or an indication that the point is or is not associated with the object.

In some examples, the point in/out maps 222(1)-(m) may comprise a probability determined by the ML architecture 200, which may include feature map(s) output by the final stage of the ML architecture 200 comprising fully-connected layer(s) 206(m), multiplied by a monocular probability and/or a Gaussian location score, as determined by a separate component of the perception engine (e.g., see U.S. patent application Ser. No. 15/970,838).

In some examples, one or more of the point in/out maps 222(1)-(m) may be additionally or alternatively provided, as input, to a post/pre-processing component 208. In at least one example, the lidar point in/out map (represented as point in/out map 222(m) in FIG. 2) may be provided to the post/pre-processing component 208. For the sake of clarity, although more than one point in/out maps (corresponding to different sensor types) may be provided to the post/pre-processing component 208, the following discusses one point in/out map, lidar point in/out map 222(m).

In an example where n objects were detected as being represented in an image, where n is a positive integer, the ML architecture 200 may generate n point in/out maps 222(1)-(m) corresponding to respective ones of the n object detections and point cloud subsets associated therewith. In an example where n is two or more, there is a possibility that a point of a first subset corresponding with a first object detection may also be part of a second subset corresponding with a second object detection (e.g., where two objects are near to each other in the image and/or where one object at least partially occludes another object in the image). In such an example it is also possible that, although the point can only belong to one of the two objects indicated by the first and second object detections respectively, the first and second point in/out maps may both identify the point as belonging to the first object and the second object—the first point in/out map may indicate that the point is associated with the first object and the second point in/out map may indicate that the point is associated with the second object.

In some examples, the post/pre-processing component 208 may comprise one or more deterministic operations for discriminating between the conflicting indications discussed above. In another example, the post/pre-processing component 208 may additionally or alternatively comprise an ML component for such discrimination. In some examples, the deterministic operations may comprise identifying the existence of the state described above (i.e., where a point is indicated by two different point in/out maps as being associated with the different respective object detections associated therewith) and determining, for that point, whether the object detections are associated with different classifications (e.g., a first classification associated with the first object classification is "pedestrian" whereas a second classification associated with the second object classification is "vehicle") or, in the case where multiple detections in a single image having the same points associated therewith. For those points that meet this criterion (e.g., the two object detections indicate different classifications or the two object detections comprise ROIs associated with different objects in a single image), the post/pre-processing component 208 may further determine the greater of a first probability indicated by the first point in/out map associated with the contested point or a second probability indicated by the second in/out map. The post/pre-processing component 208 may associate the contested point with whichever object detection corresponds to the point in/out map that indicates the greater probability. In at least some examples where classification is used as a discriminator, the point-object associated may be determined based on the point having a classification which corresponds with the image detection classification.

Once the post/pre-processing component 208 has tested the n point in/out maps for contested points that meet the criterion and resolved up any such conflicts by associating any contested points with just one of the n point in/out maps, the post/pre-processing component 208 may provide, as input, the n (tested and resolved) point in/out maps to the ROI ML model 210.

In some examples, the ROI ML model 210 may comprise a regression network that generates a three-dimensional bounding box and/or other three-dimensional indication of a volume occupied by the object. The ROI ML model 210 may receive a (tested and resolved) point in/out maps and/or an image data subset 224 associated with the object detection for which the point in/out map was generated. In some examples, the image data subset 224 may comprise an orientation (e.g., yaw) and/or a classification associated with the object detection. The ROI ML model 210 may be trained to generate, based at least in part on a point in/out map and/or the image data subset 224, a three-dimensional ROI 226 associated with the object indicated by the object detection. The three-dimensional ROI 226 may indicate a volume occupied by the object. For example, the three-dimensional ROI 226 may comprise a three-dimensional bounding box, a three-dimensional mask, etc. In some examples, the three-dimensional ROI 226 may additionally or alternatively comprise a heading and/or other indication of orientation.

In some examples, the ML architecture 200 may additionally or alternatively comprise an ROI filter 228 that may receive the three-dimension ROI 226 and determine whether to output or suppress the three-dimensional ROI 226. Put simply, the ROI filter 228 may check whether the three-dimensional ROI 226 is likely a "good" box or a "bad" box, where a "good" box fits the object well. In some examples, a "good" fit may be indicated by an intersection over union (IOU) of the three-dimensional ROI 226 to a ground truth volume of the object and/or a divergence of an orientation of the three-dimensional ROI 226 to a ground truth orientation of the object. It is understood that, at inference time, on ground truth may be available, but the following operations may achieve discarding "bad" boxes and retaining "good" boxes. In some examples, the ROI filter 228 may determine whether to output or suppress the three-dimensional ROI 226 based at least in part on determining an average probability associated with the "in" points indicated by the point in/out map(s) and determining whether the average probability meets or exceeds an average probability threshold. If the average probability does not meet the average probability threshold, the ROI filter 228 may discard the three-dimensional ROI 226, but may output the three-dimensional ROI 226 if the average probability meets or exceeds the average probability threshold.

In an additional or alternate example, the ROI filter 228 may determine an uncertainty of an orientation of the three-dimensional ROI 226. For example, determining the uncertainty may comprise identifying an orientation of the three-dimensional ROI 226, classifying the orientation into one of eight different bins from 0 to $2\pi$, and regressing a difference based at least in part on the bin into which the orientation is classified. In some examples, the ROI filter 228 may combine the average probability described above and the orientation uncertainty associated with the "in" points as a probability distribution function and determine a variance of the distribution function in sine/cosine space (as opposed to angular space), such that $2\pi$ and 0 are considered similar. If the variance meets or exceeds a threshold variance, the ROI filter 228 may discard the three-dimensional ROI 226 and, otherwise, output the three-dimensional ROI 226.

In some examples, fully-connected layer(s) 202(1)-(m), joint network block(s) (1)-(o), and fully-connected layer(s) 206(1)-(m) may be trained first, before ROI ML model 210 is trained. However, loss calculated for the ROI ML model 210 may be backpropagated, end-to-end, from the ROI ML model 210 through fully-connected layer(s) 202(1)-(m), joint network block(s) (1)-(o), and/or fully-connected layer(s) 206(1)-(m). Training these components by backpropagating the loss may comprise modifying (e.g., tuning) one or more parameters of the respective components to minimize the loss.

Example Joint Network Block

FIG. 3 illustrates a block diagram of an example of a joint network block 300, which may represent any of joint network block(s) 204(1)-(o). In some examples, the joint network block 300 may comprise components for determining a point in/out map, the probabilities of which are based on the spatial and/or non-spatial data of two or more sensor types. For example, joint network block 300 may be configured to output a point in/out map indicating probabilities that points in a radar point cloud are or are not associated with an object, where the joint network block 300 generates the point in/out map using, not only radar data, but radar data and lidar data to generate the probabilities.

In some examples, the joint network block 300 may comprise m number of pipelines, where m is the same positive integer as discussed above in regard to the overall ML architecture 200. The joint network block 300 may include components comprising fully-connected layers 302(1)-(m), fully-connected layer(s) 304(1)-(m), aggregation layers 306(1)-(m), fully-connected layer(s) 308(1)-(m), and fully-connected layer(s) 310(1)-(m).

Fully-connected layers 302(1)-(m) may receive input (represented in FIG. 3 as $A_1$ and $A_m$, respectively) from a previous stage of the ML architecture 200 and/or directly from sensors, a pre-processing component, and/or a first ML model (e.g., one or more ML models of a computer vision system). For example, depending on where in ML architecture 200 joint network block 300 exists (since joint network block 300 may represent any of joint network blocks 204(1)-(o)), the feature map 218(1) may be provided as input to fully-connected layer(s) 302(1) and/or feature map 218(m) may be provided as input to fully-connected layers 302(m), or feature map 220(1) may be provided as input to fully-connected layer(s) 302(1)), etc.

Taking a single pipeline for clarity, fully-connected layer(s) 302(m), fully-connected layer(s) 304(m), aggregation layer 306(m), fully-connected layer(s) 308(m), and/or fully-connected layer(s) 310(m) may be trained such that the fully-connected layer(s) 310(m) output a feature map that, at a discrete location of the feature map, indicates a probability that a corresponding point cloud point of the m-th sensor type is associated with the object (i.e., a point in/out map for the m-th sensor type). The fully-connected layer (s) may output a feature map.

In some examples, the ML architecture 200 and/or joint network block 300 may be trained using a corpus of object detections and point cloud data. Loss calculated an output of one or more components of the ML architecture 200 may be backpropagated, end-to-end, from the ML architecture 200 through the joint network block 300. It is also contemplated that individual models discussed herein may be trained by piecemeal backpropagation (e.g., backpropagating the loss to one component at a time). Training these components by backpropagating the loss may comprise modifying (e.g., tuning) one or more parameters of the ML architecture 200 and/or joint network block 300 to minimize the loss. In at least some examples a joint network block 204(1) may comprise the same architecture as a joint network block 204(o) and/or any of the fully-connected layer(s) in a first pipeline may have the same architecture as fully-connected layer(s) in an m-th pipeline of the same stage, but end-to-end backpropagation may result in differing parameters between the two.

For example, fully-connected layer(s) in a first pipeline and fully-connected layer(s) in an m-th pipeline of the same stage may comprise a same number and type of layers (e.g., convolutional, pooling, anchor boxes, e.g., three convolutional layers and nine different anchor boxes) having the same hyperparameters (e.g., number of filters, spatial extent, stride, amount of zero padding), but a parameter of the three convolutional layers of the fully-connected layer(s) in a first pipeline may be different than a parameter of the three convolutional layers of the fully-connected layer(s) of the m-th pipeline.

A parameter, in contrast to a hyperparameter, may comprise any parameter that is modified during training such as, for example, a weight associated with a layer or components thereof (e.g., a filter, node). So, while the number of filters, spatial extent, stride, anchor boxes, layer types, layer connections, input size (e.g., tensor, having dimensions $W_1 \times H_1 \times D_1$, received from a previous stage in the pipeline) and/or type, output size and/or type (e.g., tensor having dimensions having dimensions $W_1 \times H_1 \times D_1$ or $W_2 \times H_2 \times D_2$), etc. would be the same for the fully-connected layer(s) of the first pipeline and the fully-connected layer(s) of the m-th pipeline, parameters associated with components thereof may be different between the fully-connected layer(s) of the first pipeline and the fully-connected layer(s) of the m-th pipeline. Although various examples of hyperparameters are given herein, it is contemplated that one or more of the hyperparameters may be parameters, depending on the training method.

In some examples, components of a pipeline of the ML architecture 200 and/or joint network block 300 may be trained distinctly from and/or jointly with other pipelines. For example, a first loss may be determined for a "radar" pipeline (e.g., a pipeline that determines a point in/out map for radar data) and an m-th loss may be determined for a "lidar" pipeline. The first loss may be backpropagated through a first pipeline and the m-th loss may backpropagated through the m-th pipelines. However, in additional or alternate examples, a composite loss may be determined based at least in part on the first loss and the m-th loss and/or based on a separate loss determination and the composite loss may be backpropagated through one or more of the first through m-th pipeline.

Returning to the joint network block 300 architecture and operations, fully-connected layer(s) 302(m), fully-connected layer(s) 304(m), aggregation layer 306(m), fully-connected layer(s) 308(m), and/or fully-connected layer(s) 310(m) may comprise artificial neural network feed-forward layers, such as a multi-layer perceptron. In some examples, fully-connected layer(s) 302(1)-(m) be m number of multi-layer perceptrons that output feature maps 312(1)-(m), respectively. In some examples, a feature map 312(m) may comprise a tensor comprising representation(s) of operations conducted by the respective components of fully-connected layer(s) 302(m). These operations may comprise characteristics of the underlying sensor data and/or previous feature maps provided as input to the fully-connected layer(s) 302(m).

Feature maps 312(1)-(m) may be provided, as input, to fully-connected layer(s) 304(1)-(m), which may, in turn, generate feature maps 314(1)-(m). Feature maps 314(1)-(m) may be provided, as input, to aggregation layers 306(1)-(m). Aggregation layers 301(1)-(m) may comprise a pooling layer, a normalization layer, and/or any other form of a down-sampling or data alignment layer. In some examples, aggregation layer 301(1)-(m) may determine a maxpool, average pool, and/or L2-norm pool of feature maps 314(1)-(m), resulting in global features 316(1)-(m). Note that global features 316(1)-(m) may have a dimension that is a fraction of feature maps 312(1)-(m) and/or feature map(s) 314(1)-(m). In some examples, fully-connected layer(s) may increase a dimension of data output therefrom, in comparison to data provided as input to the fully-connected layer(s). In some examples, global features 316(m) may represent the strongest (e.g., greatest magnitude) activations in different regions of the feature map 314(m).

In some examples, the joint network block 300 may concatenate (318) global features 316(1)-(m) to form combined global features 320(1)-(m) according to a specified order used at training and inference. For example, the joint network block 300 may concatenate radar global features (global features 316(1) in the depicted example) together with lidar global features (global features 316(m) in the depicted example), keeping the order the same at training and inference time (e.g., radar first and lidar second in the order). In some examples, concatenating the global features 316(1)-(m) causes the output of subsequent layers to be based at least in part on data from different types of sensor data (up to all of the different types of sensor data provided as input to the ML architecture 200). For example, combined global features 320(1)-(m) may identify properties of the radar and lidar data determined by previous layers. The joint network block 300 may thereby be trained to process feature maps and/or sensor data of different sensor types and/or spatial and non-spatial data.

In some examples, the combined global features 320(1)-(m) may be a single tensor that represents the concatenated global features 316(1)-(m). In an additional or alternate example, the combined global features 320(1)-(m) may be distinct tensors.

In some examples, the combined global features 320(1)-(m) may be provided to fully connected layer(s) 308(1)-(m). An output of fully-connected layer(s) 308(1)-(m) may be copied and stacked, as stacked outputs 322(1)-(m), such that a dimension of stacked outputs 322(1)-(m) matches a dimension of feature maps 312(1)-(m). For example, joint network 300 may generate stacked output 322(m) by concatenating copies of the output of fully-connected layer(s) 308(m) until the dimension of stacked output 322(m) matches a dimension of feature map 312(m).

In some examples, the joint network block 300 may sum the stacked outputs 322(1)-(m) and feature maps 312(1)-(m) at summation operation 324, as summed and stacked outputs 322(1)-(m). Summing stacked outputs 322(1)-(m) and feature maps 312(1)-(m) may treat stacked outputs 322(1)-(m) as a residual or an offset of feature maps 312(1)-(m). The summed and/or stacked outputs 322(1)-(m) may be provided to fully-connected layer(s) 310(1)-(m), which may generate a feature map (unillustrated for lack of space) based at least in part on the summed and/or stacked outputs 322(1)-(m). In an additional or alternate example, the summation operation 324 may comprise any element-wise arithmetic operation. In some examples, the feature map generated by fully-connected layer(s) 310(1) may comprise feature maps 220(1)-(m) and/or point in/out maps 222(1)-(m). In some examples, fully-connected layer(s) 310(1)-(m) may be fully-connected layer(s) 206(1)-(m) although, in another example, fully-connected layer(s) 310(1)-(m) may be a distinct layer from fully-connected layer(s) 206(1)-(m).

In some examples, a joint network block 300 may conduct the concatenation operation for p of m total sensor types, where p is a positive integer. In some examples, p may equal m for a first joint network block of the ML architecture 200 or for all joint network blocks of the ML architecture 200. In an additional or alternate example, for at least one of the joint network blocks 300 of the ML architecture 200 p may be less then m. For example, if one form of sensor data requires less processing, feature maps corresponding to that sensor data type may be excluded from the concatenation operation 318 and/or summation operation 324 and/or may bypass that joint network block altogether.

In some examples, the feature maps discussed herein may comprise a tensor comprising representation(s) of operations conducted by the respective components of the ML architecture and/or joint network block on input data, depending on the type of ML model(s) of the ML architecture 200. As a non-limiting example, each feature map may comprise a point-cloud-like representation in which each "point" of the feature map is associated with a vector having a dimension of 128 (or 256 or 354 for some of the feature maps described in FIG. 3) which describes a point or region of the input point cloud. Although the discussion here attempts to explain the content of some of the feature maps, it is understood that the feature maps may not be described in humanly-comprehensible terms, as the feature maps may comprise an output that may be a computer and/or neural network transformation of the input thereto. As such, the feature maps may comprise a high-dimensional field of values generated by layer(s) of the respective components of the ML architecture 200 and/or joint network block 300 (e.g., vectors and/or tensors of values representing intrinsic properties of the data determined based on the learned parameters).

Moreover, although the discussion herein includes "fully-connected layer(s)", it is understood that such layer(s) may be a single-layer perceptron and/or a multi-layer perceptron and that nodes of the layer(s) may be fully-connected to activations of previous/subsequent layers, but in additional or alternate examples, the connections may be trimmed or otherwise disassociated between layers. Moreover, the fully-connected layer(s) may comprise the same or different hyperparameters. In some examples, fully-connected layer(s) of a same stage may have the same hyperparameters but may have different parameters, although it is contemplated that fully-connected layer(s) may have different hyperparameters per pipeline, which may mean that a stage may comprise fully-connected layer(s) having different hyperparameters. In some examples, the fully-connected layer(s) may additionally or alternatively comprise a convolution node and/or a rectified linear node.

Example Process

Figure 4A:
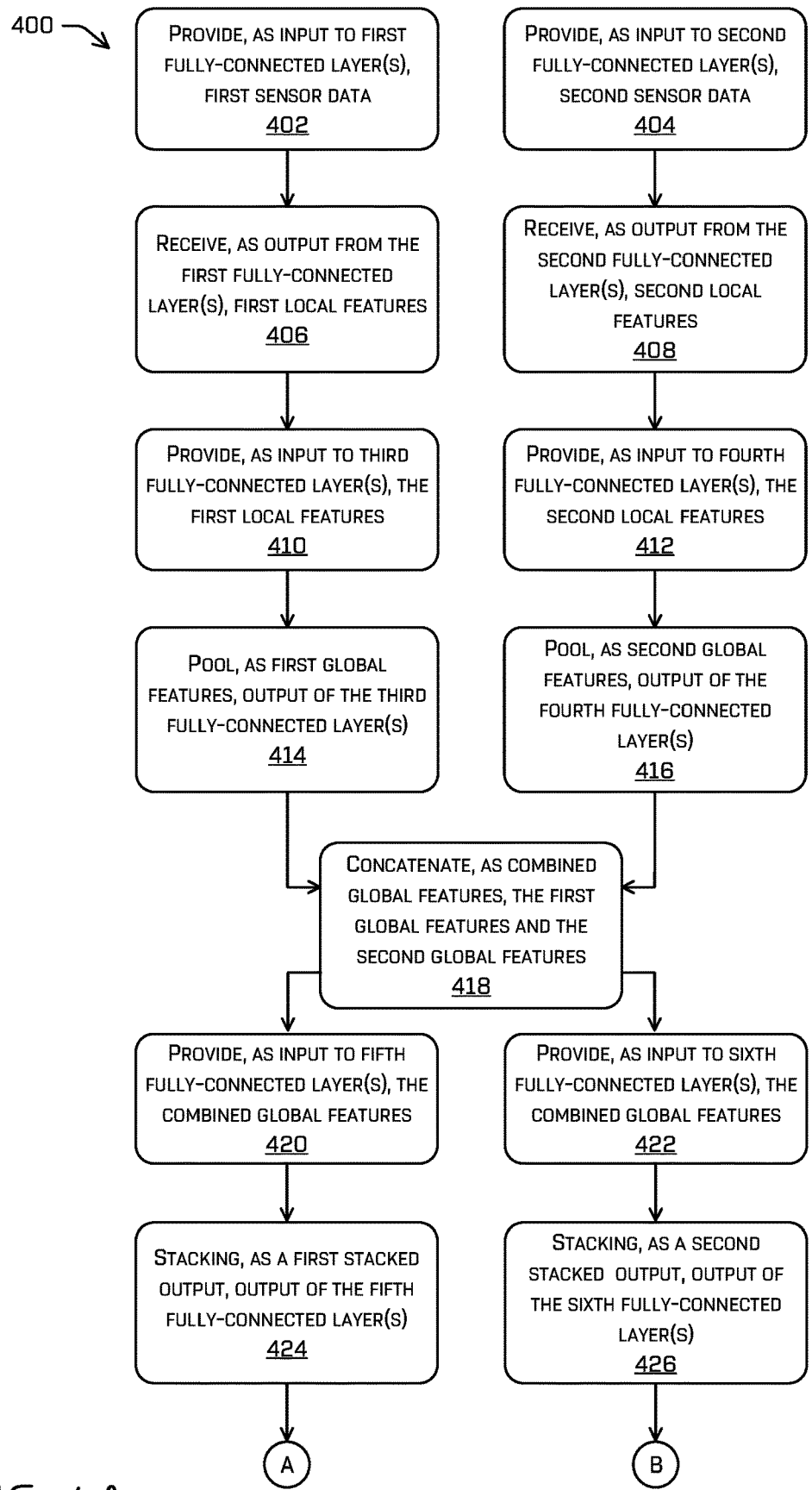
FIGS. 4A and 4B illustrate a flow diagram of an example process for associating point cloud data with an object detection and/or generating a three-dimensional ROI.
Figure 4B:
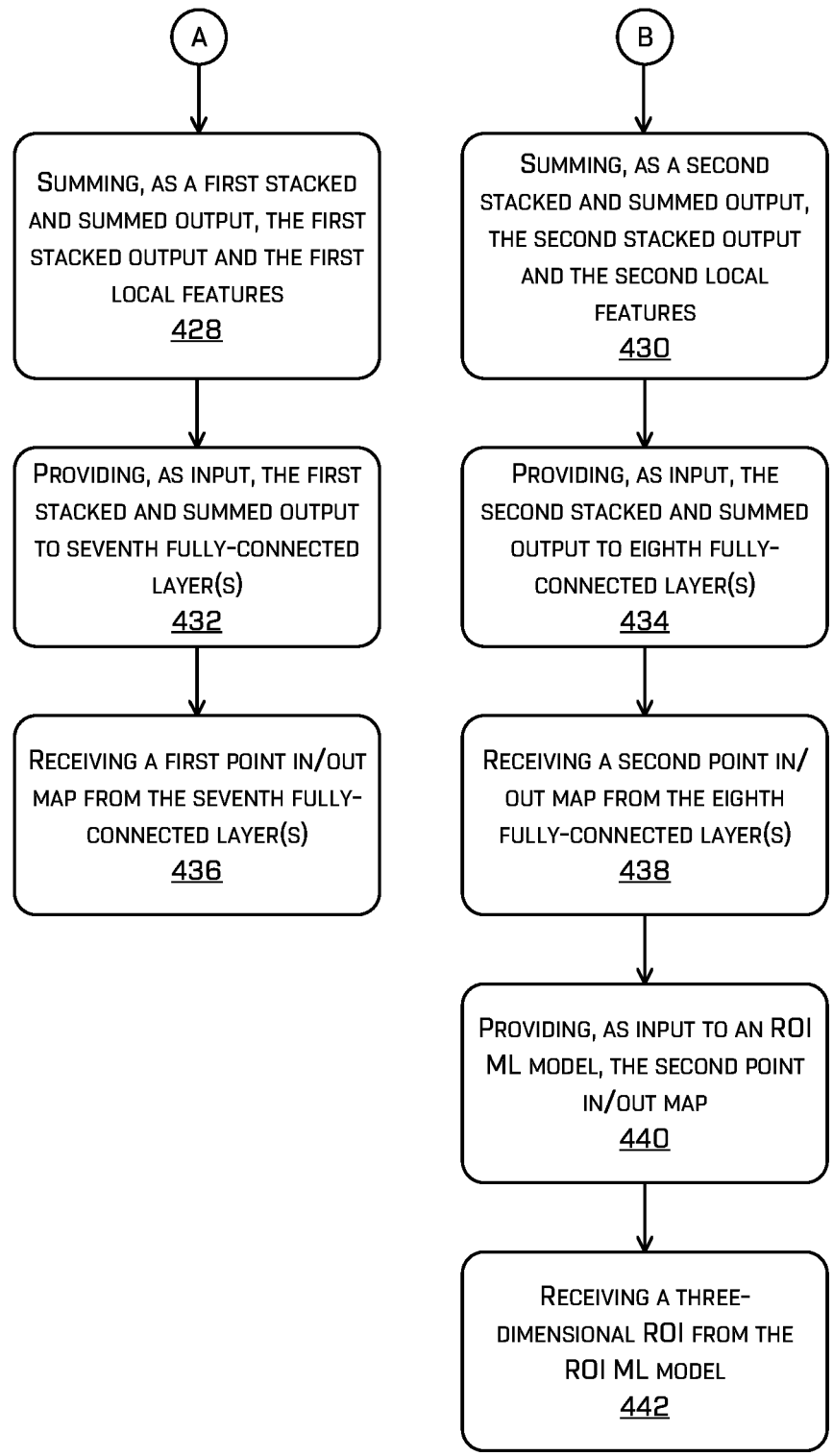

FIGS. 4A and 4B illustrates an example process 400 for associating point cloud data with an object detection and/or generating a three-dimensional ROI. In some examples, example process 400 may be accomplished by component(s) of ML architecture 200. In some examples, the ML architecture 200 may comprise greater or fewer fully-connected layers at any of the operations discussed herein. Additionally or alternatively, the example process 400 may include more or less operations and/or may repeat operations.

At operation 402, example process 400 may comprise providing, as input to first fully-connected layer(s), first sensor data, according to any of the techniques discussed herein. For example, first sensor data may comprise at least first point cloud data associated with a first sensor type. In some examples, the first sensor data may be a subset of sensor data determined based at least in part on an object detection. The first sensor data may additionally or alternatively comprise first non-spatial data. The first fully-connected layer(s) may comprise fully-connected layer(s) 302(1) and/or may be associated with a first pipeline of ML architecture 200 and/or joint network block 300.

At operation 404, example process 400 may comprise providing, as input to second fully-connected layer(s), second sensor data, according to any of the techniques discussed herein. For example, second sensor data may comprise at least second point cloud data associated with a second sensor type. In some examples, the second sensor data may be a subset of sensor data determined based at least in part on the object detection. The second sensor data may additionally or alternatively comprise second non-spatial data. The second fully-connected layer(s) may comprise fully-connected layer(s) 302(m) and/or may be associated with an m-th pipeline of ML architecture 200 and/or joint network block 300.

At operations 406 and 408, respectively, example process 400 may comprise receiving first local features and second local features as output from the first fully-connected layer(s) and second fully-connected layer(s), respectively, according to any of the techniques discussed herein.

At operations 410 and 412, respectively, example process 400 may comprise providing, as input, the first local features to third fully-connected layer(s) and the second local features to fourth fully-connected layer(s), according to any of the techniques discussed herein. In some examples, the third fully-connected layer(s) may be associated with the first pipeline and the fourth fully-connected layer(s) may be associated with the m-th pipeline.

At operations 414 and 416, respectively, example process 400 may comprise pooling, as first global features, output of the third fully-connected layer(s) and pooling, as second global features, output of the fourth fully-connected layer(s), according to any of the techniques discussed herein.

At operation 418, example process 400 may comprise concatenating, as combined global features, the first global features and the second global features, according to any of the techniques discussed herein.

At operation 420 and 422, respectively, example process 400 may comprise providing, as input to fifth fully-connected layer(s) and sixth fully-connected layer(s), the combined global features, according to any of the techniques discussed herein. In some examples, the fifth fully-connected layer(s) may be associated with the first pipeline and the sixth fully-connected layer(s) may be associated with the m-th pipeline.

At operation 424, example process 400 may comprise stacking, as a first stacked output, output of the fifth fully-connected layer(s) (the stacked output and/or the output of the fifth fully-connected layers may be referred to herein as transformed concatenated data), according to any of the techniques discussed herein. For example, operation 420 may comprise concatenating copies of output of the fifth fully-connected layer(s) until a dimension of the first stacked output equals a dimension of the first local features.

At operation 426, example process 400 may comprise stacking, as a second stacked output, output of the sixth fully-connected layer(s) (the stacked output and/or the output of the sixth fully-connected layers may be referred to herein as transformed concatenated data), according to any of the techniques discussed herein. For example, operation 422 may comprise concatenating copies of output of the sixth fully-connected layer(s) until a dimension of the second stacked output equals a dimension of the second local features.

Turning to FIG. 4B, at operation 428, example process 400 may comprise summing, as a first stacked and summed output, the first stacked output and the first local features, according to any of the techniques discussed herein. In some examples, the summation may be a simple summation, instead of a concatenation, although, in other examples, the summation may comprise a concatenation.

At operation 430, example process 400 may comprise summing, as a second stacked and summed output, the second stacked output and the second local features, according to any of the techniques discussed herein. In some examples, the summation may be a simple summation, instead of a concatenation, although, in other examples, the summation may comprise a concatenation.

At operations 432 and 434, respectively, example process 400 may comprise providing, as input, the first stacked and summed output to seventh fully-connected layer(s) and the second stacked and summed output to eighth fully-connected layer(s), according to any of the techniques discussed herein. In some examples, the seventh fully-connected layer(s) may be associated with the first pipeline and the eight fully-connected layer(s) may be associated with an m-th pipeline.

At operations 436 and 438, respectively, example process 400 may comprise receiving a first point in/out map from the seventh fully-connected layer(s) and a second point in/out map from the eighth fully-connected layer(s), according to any of the techniques discussed herein. For example, the first point in/out map may comprise a first probability that a first point cloud point of a first type is associated with an object indicated by an object detection and the second point in/out map may comprise a second probability that a second point cloud point of a second type is associated with the object.

At operation 440, example process 400 may comprise providing, as input to an ROI ML model, the second point in/out map, according to any of the techniques discussed herein. In some examples, operation 440 may comprise pre-processing the second point in/out map to de-duplicate indications between two point in/out maps generated by the m-th pipeline that a common point of the two maps is associated with two different object detections. In some examples, operation 436 may comprise providing more than one type of point in/out map to the ROI ML model.

At operation 442, example process 400 may comprise receiving a three-dimensional ROI from the ROI ML model, according to any of the techniques discussed herein. In some examples, operations 440 and/or 442 may be accomplished by component(s) after final joint network block(s) in the ML architecture 200.

Example System

Figure 5:
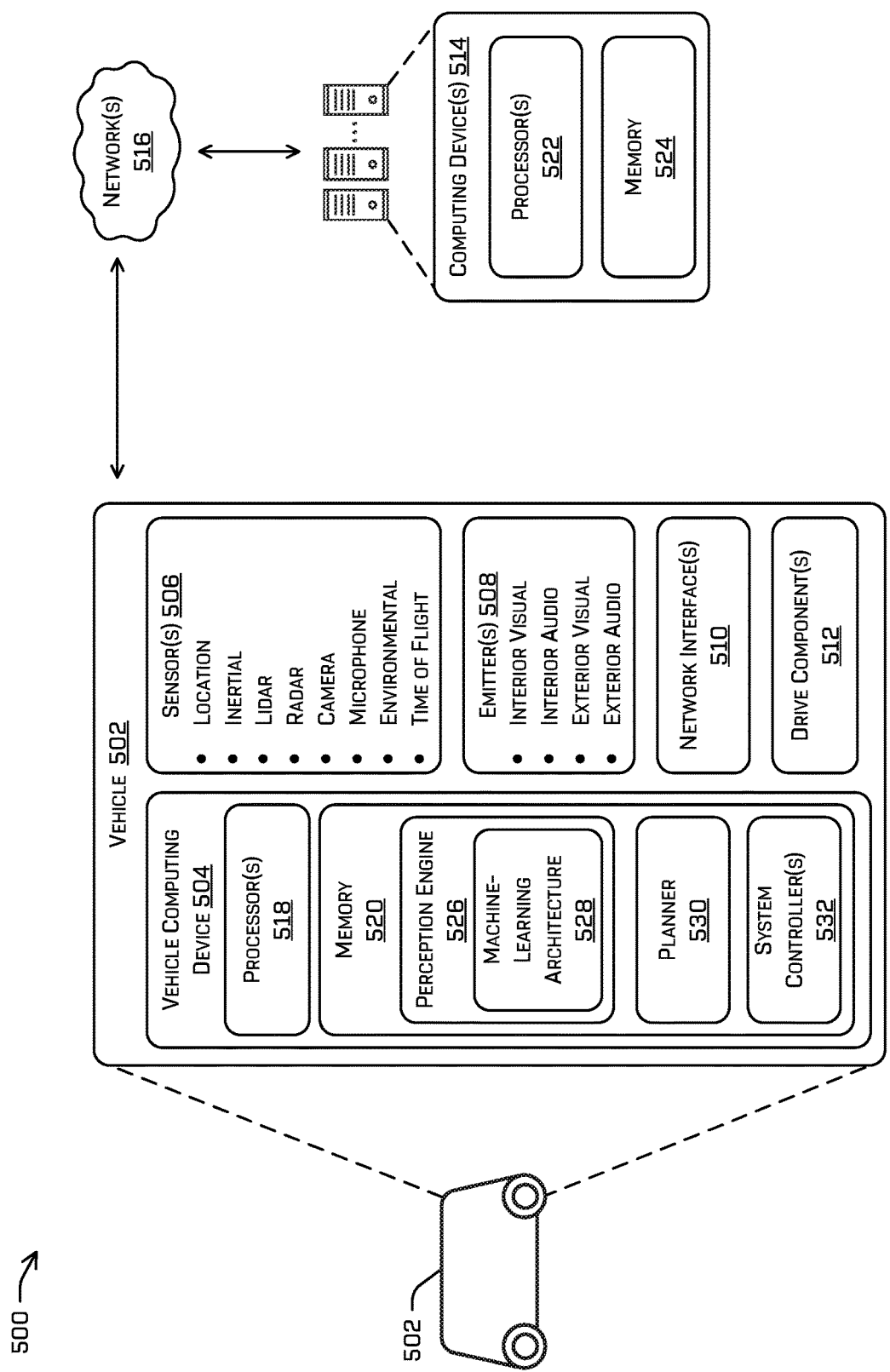
FIG. 5 illustrates a block diagram of an example system for associating point cloud data with an object detection and/or generating a three-dimensional ROI.

FIG. 5 illustrates a block diagram of an example system that implements the techniques discussed herein. In some instances, the system 500 may include a vehicle 502, which may correspond to the autonomous vehicle 102 in FIG. 1. In some instances, the vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 502 may be a fully or partially autonomous vehicle having any other level or classification. Moreover, in some instances, the techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

The vehicle 502 may include a vehicle computing device 504, one or more sensor(s) 506, one or more emitters 508, one or more network interfaces 510, and/or one or more drive components 512.

In some instances, the sensor(s) 506 may include lidar sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, ToF, etc.), microphones, wheel encoders, environment sensors (e.g., temperature sensors, humidity sensors, light sensors, pressure sensors, etc.), etc. The sensor(s) 506 may include multiple instances of each of these or other types of sensors. For instance, the lidar sensors may include individual lidar sensors located at the corners, front, back, sides, and/or top of the vehicle 502. As another example, the cameras may include multiple cameras disposed at various locations about the exterior and/or interior of the vehicle 502. The sensor(s) 506 may provide input to the vehicle computing device 504.

The vehicle 502 may also include emitter(s) 508 for emitting light and/or sound, as described above. The emitter(s) 508 in this example may include interior audio and visual emitter(s) to communicate with passengers of the vehicle 502. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 508 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 502 may also include network interface(s) 510 that enable communication between the vehicle 502 and one or more other local or remote computing device(s). For instance, the network interface(s) 510 may facilitate communication with other local computing device(s) on the vehicle 502 and/or the drive component(s) 512. Also, the network interface (s) 510 may additionally or alternatively allow the vehicle to communicate with other nearby computing device(s) (e.g., other nearby vehicles, traffic signals, etc.). The network interface(s) 510 may additionally or alternatively enable the vehicle 502 to communicate with a computing device(s) 514. In some examples, computing device(s) 514 may comprise one or more nodes of a distributed computing system (e.g., a cloud computing architecture).

The network interface(s) 510 may include physical and/or logical interfaces for connecting the vehicle computing device 504 to another computing device or a network, such as network(s) 516. For example, the network interface(s) 510 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device 504 and/or the sensor(s) 506 may send sensor data, via the network(s) 516, to the computing device(s) 514 at a particular frequency, after a lapse of a predetermined period of time, in near real-time, etc.

In some instances, the vehicle 502 may include one or more drive components 512. In some instances, the vehicle 502 may have a single drive component 512. In some instances, the drive component(s) 512 may include one or more sensors to detect conditions of the drive component(s) 512 and/or the surroundings of the vehicle 502. By way of example and not limitation, the sensor(s) of the drive component(s) 512 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, RADAR sensors, etc. Some sensors, such as the wheel encoders may be unique to the drive component(s) 512. In some cases, the sensor(s) on the drive component(s) 512 may overlap or supplement corresponding systems of the vehicle 502 (e.g., sensor(s) 506).

The drive component(s) 512 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 512 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 512. Furthermore, the drive component(s) 512 may also include one or more communication connection(s) that enable communication by the respective drive component with one or more other local or remote computing device(s).

The vehicle computing device 504 may include one or more processors 518 and memory 520 communicatively coupled with the one or more processors 518. Computing device(s) 514 may additionally or alternatively include processor(s) 522, and/or memory 524. The processor(s) 518 and/or 522 may be any suitable processor capable of executing instructions to process data and perform operations as described herein. By way of example and not limitation, the processor(s) 518 and/or 522 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 520 and/or 524 may be examples of non-transitory computer-readable media. The memory 520 and/or 524 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 520 and/or memory 524 may store a perception engine 526, which may comprise an ML architecture 528, a planner 530, and/or system controller(s) 532. Perception engine 526 may represent perception engine 120, ML architecture 528 may include and/or represent ML architecture 200 (and/or pre-processing component 132, and/or second ML model 134), and planner 530 may represent planner 122. In some instances, perception engine 526 may comprise a primary perception system, a secondary perception system, a prediction system, and/or a localization system. The memory 520 and/or 524 may additionally or alternatively store a mapping system, a planning system, a ride management system, etc. Although perception engine 526 and ML architecture 528 are illustrated as being stored in memory 520, perception engine 526 and/or ML architecture 528 may be stored in memory 524 and/or may include processor-executable instructions, machine-learned model(s), and/or hardware.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Memory 520 may additionally or alternatively store one or more system controller(s) 532 (which may additionally or alternatively be implemented as hardware), which may be configured to control steering, propulsion, braking, safety, emitters, communication, and other systems of the vehicle 502. These system controller(s) 532 may communicate with and/or control corresponding systems of the drive component(s) 512 and/or other components of the vehicle 502. For example, the planner 530 may generate instructions based at least in part on a classification, sub-classification, and/or ROI generated by the perception engine 526 and transmit the instructions to the system controller(s) 532, which may control operation of the vehicle 502 based at least in part on the instructions.

It should be noted that while FIG. 5 is illustrated as a distributed system, in alternative examples, components of the vehicle 502 may be associated with the computing device(s) 514 and/or components of the computing device(s) 514 may be associated with the vehicle 502. That is, the vehicle 502 may perform one or more of the functions associated with the computing device(s) 514, and vice versa.

Example Clauses

A. A method comprising: receiving first sensor data associated with a first type of sensor, the first sensor data representing a portion of an environment surrounding an autonomous vehicle; receiving second sensor data associated with a second type of sensor, the second sensor data representing a same portion or different portion of the environment as the portion represented by the first sensor data; receiving an object detection, wherein the object detection identifies an object in one or more images; determining, based at least in part on the object detection, a first subset of the first sensor data and a second subset of the second sensor data; inputting the first subset of the first sensor data into a first subnetwork; inputting the second subset of the second sensor data into a second subnetwork; receiving a first output from the first subnetwork and a second output from the second subnetwork; combining, as a combined output, the first output and the second output; inputting a first portion of the combined output into a third subnetwork and a second portion of the combined output into a fourth subnetwork; and receiving a first map from the third subnetwork and a second map from the fourth subnetwork, wherein: the first map indicates at least a first probability that a first point of the first sensor data is associated with the object, and the second map indicates at least a second probability that a second point of the second sensor data is associated with the object.

B. The method of paragraph A, further comprising: inputting, to an ROI machine-learning model, at least one of the first map or the second map and at least a portion of the object detection; and receiving, from the ROI machine-learning model, a three-dimensional region of interest.

C. The method of either paragraph A or B, wherein the first type of sensor is a radar sensor and the second type of sensor is a lidar sensor.

D. The method of any one of paragraphs A-C, wherein combining the first output and the second output comprises: down-sampling, as first global data and using one or more first network layers, the first output; down-sampling, as second global data and using one or more network second layers, the second output; concatenating, as concatenated data, the first global data with the second global data; inputting the concatenated data into a first fully-connected layer and a second fully-connected layer; receiving first transformed concatenated data from the first fully-connected layer and second transformed concatenated data from the second fully-connected layer; adding, as first summed data, the first output with the first transformed concatenated data; and adding, as second summed data, the second output with the second transformed concatenated data, wherein the first portion of combined data comprises an output from the first fully connected layer, and wherein the second portion of combined data comprises an output from the second fully connected layer.

E. The method of any one of paragraphs A-D, further comprising controlling the autonomous vehicle based at least in part on at least one of the first map or the second map.

F. The method of any one of paragraphs A-E, wherein the first subnetwork comprises a first set of one or more fully-connected layers and the second subnetwork comprises a second set of one or more fully-connected layers.

G. The method of any one of paragraphs A-F, further comprising determining the first subset and the second subset based at least in part on: projecting, as first projected data, the first sensor data into an image space associated with an image sensor that captured at least one of the one or more images, wherein the projecting is based at least in part on an orientation of the image sensor; projecting, as second projected data and based at least in part on the orientation, the second sensor data into the image space; identifying first points of the first sensor data associated with a first portion of the first projected data that lies within extents of the object detection; identifying second points of the second sensor data associated with a second portion of the second projected data that lies within extents of the object detection; translating, as the first subset, the first points from a first coordinate space associated with the first type of sensor to a coordinate space defined as having an origin located at a position of the image sensor and a longitudinal axis extending through a center of an ROI associated with the object detection; and translating, as the second subset, the second points from a second coordinate space associated with the second type of sensor to the coordinate space defined as having an origin located at a position of the image sensor.

H. The method of any one of paragraphs A-G, wherein the first sensor data comprises radar data and the method further comprises setting a height identified by the radar data to equal a location relative to an ROI identified by the object detection.

I. The method of any one of paragraphs A-H, wherein: the first subset comprises first spatial data associated with a first sensor type; the second subset comprises second spatial data associated with a second sensor type; inputting the first subset and the second subset further comprises inputting, along with at least one of the first subset or the second subset, non-spatial data; and the non-spatial data comprises at least one of: a monocular depth probability distribution, a radar cross-section, doppler, doppler variance, signal-to-noise ratio, range variance, an object classification associated with the object detection, an instance segmentation associated with the object detect, an instance label associated with one or more portions of object detection, a semantic segmentation associated with the object detection, a top-down segmentation, or an orientation of an ROI associated with the object detection.

J. A system comprising: one or more processors; and a memory storing processor-executable instructions that, when executed by the one or more processors, cause the system to perform operations comprising: receiving first sensor data associated with a first type of sensor; receiving second sensor data associated with a second type of sensor; receiving an object detection, wherein the object detection identifies an object in one or more images; inputting, to a first subnetwork, a first subset of the first sensor data; inputting, to a second subnetwork, a second subset of the second sensor data; combining, as combined data, a first output of the first subnetwork and a second output of the second subnetwork; inputting, to a third subnetwork, a first portion of the combined data; inputting, to a fourth subnetwork, a second portion of the combined data; receiving, from the third subnetwork, a first map indicating at least a first probability that a first point of the first sensor data is associated with the object; and receiving, from the fourth subnetwork, a second map indicating at least a second probability that a second point of the second sensor data is associated with the object.

K. The system of paragraph J, wherein the operations further comprise: inputting, to an ROI machine-learning model, at least one of the first map or the second map and at least a portion of the object detection; and receiving, from the ROI machine-learning model, a three-dimensional region of interest.

L. The system of either paragraph J or K, wherein the operations further comprise: determining, from among a first plurality of points of the first map and a second plurality of points of the second map, a set of points that are associated with probabilities that meet or exceed a probability threshold, wherein the set of points lie within the three-dimensional region of interest; determining at least one of: an average probability of the probabilities associated with the set of points, an angle of uncertainty associated with the set of points, or a variance of a distribution function over the average probability and the angle of uncertainty; and outputting the three-dimensional region of interest based at least in part on determining that at least one of the average probability meets or exceeds an average probability threshold, the angle of uncertainty is less than an uncertainty threshold, or the variance is less than a variance threshold.

M. The system of any one of paragraphs J-L, wherein the first sensor data is associated with a radar sensor and the second sensor data is associated with a lidar sensor.

N. The system of any one of paragraphs J-M, wherein the operations further comprise: projecting, as first projected data, the first sensor data into an image space associated with an image sensor that captured at least one of the one or more images, wherein the projecting is based at least in part on at least one of an orientation of the image sensor; projecting, as second projected data and based at least in part on the orientation, the second sensor data into the image space; identifying first points of the first sensor data associated with a first portion of the first projected data that lies within extents of the object detection; identifying second points of the second sensor data associated with a second portion of the second projected data that lies within extents of the object detection; translating, as the first subset, the first points from a first coordinate space associated with the first type of sensor to a coordinate space defined as having an origin located at a position of the image sensor and a longitudinal axis extending through a center of an ROI associated with the object detection; and translating, as the second subset, the second points from a second coordinate space associated with the second type of sensor to the coordinate space defined as having an origin located at a position of the image sensor.

O. The system of any one of paragraphs J-N, wherein combining the first output and the second output comprises: down-sampling, as first global data and using one or more first network layers, the first output; down-sampling, as second global data and using one or more network second layers, the second output; concatenating, as concatenated data, the first global data with the second global data; inputting the concatenated data into a first fully-connected layer and a second fully-connected layer; receiving first transformed concatenated data from the first fully-connected layer and second transformed concatenated data from the second fully-connected layer; adding, as first summed data, the first output with the first transformed concatenated data; and adding, as second summed data, the second output with the second transformed concatenated data.

P. The system of any one of paragraphs J-O, wherein at least one of: the first subnetwork has a substantially similar first architecture as the second subnetwork, the first subnetwork associated with first parameters which differ from second parameters associated with the second subnetwork; or the third subnetwork has a substantially similar second architecture as the fourth subnetwork, the third subnetwork associated with third parameters which differ from fourth parameters associated with the fourth subnetwork.

Q. The system of any one of paragraphs J-P, wherein the indication comprises at least one of a region of interest of an image, an orientation associated with the region of interest, an object classification associated with the region of interest, or a monocular depth probability associated with the region of interest.

R. The system of any one of paragraphs J-Q, wherein: the object detection is a first object detection and the object is a first object; the operations further comprise receiving a third map associated with a second object detection, the third map comprising the first point associated with a third probability that the third point is associated with a second object different than the first object; the first probability and the third probability both meet or exceed a threshold probability; and the operations further comprise excluding the first point from association with the first object detection based at least in part on at least one of: determining that the first point is associated with a first classification and a second classification, determining that the first point is associated with both the first object detection and the second object detection, or determining that the first probability is less than the third probability.

S. A non-transitory computer-readable medium storing computer-executable instructions that, when executed by one or more processors, cause a computing device to perform operations comprising: receiving first sensor data associated with a first type of sensor; receiving second sensor data associated with a second type of sensor; receiving an object detection, wherein the object detection identifies an object in one or more images; inputting, to a first subnetwork, a first subset of the first sensor data; inputting, to a second subnetwork, a second subset of the second sensor data; combining, as combined data, a first output of the first subnetwork and a second output of the second subnetwork; inputting, to a third subnetwork, a first portion of the combined data; inputting, to a fourth subnetwork, a second portion of the combined data; receiving, from the third subnetwork, first data indicating at least a first probability that a first point of the first sensor data is associated with the object; and receiving, from the fourth subnetwork, second data indicating at least a second probability that a second point of the second sensor data is associated with the object.

T. The non-transitory computer-readable medium of paragraph S, wherein the operations further comprise: inputting, to a machine-learning model, at least one of the first data or the second data and the indication; and receiving, from the machine-learning model a three-dimensional region of interest.

U. The non-transitory computer-readable medium of either paragraph S or T, wherein the operations further comprise: determining, from among a first plurality of points of the first data and a second plurality of points of the second data, a set of points that are associated with probabilities that meet or exceed a probability threshold, wherein the set of points lie within the three-dimensional region of interest; determining at least one of: an average probability of the probabilities associated with set of points, or a variance of a distribution function over the average probability and the angle of uncertainty; and outputting the three-dimensional region of interest based at least in part on determining that at least one of the average probability meets or exceeds an average probability threshold or the variance is less than a variance threshold.

V. The non-transitory computer-readable medium of any one of paragraphs S-U, wherein the first sensor data is associated with a radar sensor and the second sensor data is associated with a lidar sensor.

W. The non-transitory computer-readable medium of any one of paragraphs S-V, wherein combining the first output and the second output comprises: down-sampling, as first global data and using one or more first network layers, the first output; down-sampling, as second global data and using one or more network second layers, the second output; concatenating, as concatenated data, the first global data with the second global data; inputting the concatenated data into a first fully-connected layer and a second fully-connected layer; receiving first transformed concatenated data from the first fully-connected layer and second transformed concatenated data from the second fully-connected layer; adding, as first summed data, the first output with the first transformed concatenated data; and adding, as second summed data, the second output with the second transformed concatenated data, wherein the first portion of combined data comprises an output from the first fully connected layer, and wherein the second portion of combined data comprises an output from the second fully connected layer.

X. The non-transitory computer-readable medium of any one of paragraphs S-W, wherein: the first subnetwork has a substantially similar first architecture as the second subnetwork, the first subnetwork associated with first parameters which differ from second parameters associated with the second subnetwork; or the third subnetwork has a substantially similar second architecture as the fourth subnetwork, the third subnetwork associated with third parameters which differ from fourth parameters associated with the fourth subnetwork.

Y. A system comprising: one or more processors; and a memory storing processor-executable instructions that, when executed by the one or more processors, cause the system to perform operations comprising the operations of any one of paragraphs A-G.

Z. A non-transitory computer-readable medium storing computer-executable instructions that, when executed by one or more processors, cause a computing device to perform operations comprising the operations of any one of paragraphs A-G.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:
1. A method comprising:
receiving first sensor data associated with a first type of sensor, the first sensor data representing a portion of an environment surrounding an autonomous vehicle;

receiving second sensor data associated with a second type of sensor, the second sensor data representing a same portion or different portion of the environment as the portion represented by the first sensor data;

receiving an object detection, wherein the object detection identifies an object in one or more images;

determining, based at least in part on the object detection, a first subset of the first sensor data and a second subset of the second sensor data;

inputting the first subset of the first sensor data into a first subnetwork;

inputting the second subset of the second sensor data into a second subnetwork;

receiving a first output from the first subnetwork and a second output from the second subnetwork;

combining, as a combined output, the first output and the second output;

inputting a first portion of the combined output into a third subnetwork and a second portion of the combined output into a fourth subnetwork;

receiving a first map from the third subnetwork and a second map from the fourth subnetwork, wherein:
the first map indicates at least a first probability that a first point of the first sensor data is associated with the object, and
the second map indicates at least a second probability that a second point of the second sensor data is associated with the object; and determining, based at least in part on at least one of the first map or the second map, a three-dimensional region of interest.

2. The method of claim 1, wherein determining the three-dimensional region of interest comprises:
inputting, to an ROI machine-learning model, at least one of the first map or the second map and at least a portion of the object detection; and
receiving, from the ROI machine-learning model, the three-dimensional region of interest.

3. The method of claim 1, wherein the first type of sensor is a radar sensor and the second type of sensor is a lidar sensor.

4. The method of claim 1, wherein combining the first output and the second output comprises:
down-sampling, as first global data and using one or more first network layers, the first output;
down-sampling, as second global data and using one or more network second layers, the second output;
concatenating, as concatenated data, the first global data with the second global data;
inputting the concatenated data into a first fully-connected layer and a second fully-connected layer;
receiving first transformed concatenated data from the first fully-connected layer and second transformed concatenated data from the second fully-connected layer;
adding, as first summed data, the first output with the first transformed concatenated data; and
adding, as second summed data, the second output with the second transformed concatenated data,
wherein the first portion of combined data comprises an output from the first fully connected layer, and
wherein the second portion of combined data comprises an output from the second fully connected layer.

5. The method of claim 1, further comprising controlling the autonomous vehicle based at least in part on at least one of the first map or the second map.

6. The method of claim 1, wherein the first subnetwork comprises a first set of one or more fully-connected layers and the second subnetwork comprises a second set of one or more fully-connected layers.

7. The method of claim 1, further comprising determining the first subset and the second subset based at least in part on:
projecting, as first projected data, the first sensor data into an image space associated with an image sensor that captured at least one of the one or more images, wherein the projecting is based at least in part on an orientation of the image sensor;
projecting, as second projected data and based at least in part on the orientation, the second sensor data into the image space;
determining first points of the first sensor data associated with a first portion of the first projected data that lies within extents of the object detection;
determining second points of the second sensor data associated with a second portion of the second projected data that lies within extents of the object detection;
determining, as the first subset, the first points from a first coordinate space associated with the first type of sensor to a coordinate space defined as having an origin located at a position of the image sensor and a longitudinal axis extending through a center of an ROI associated with the object detection; and
determining, as the second subset, the second points from a second coordinate space associated with the second type of sensor to the coordinate space defined as having an origin located at a position of the image sensor.

8. The method of claim 1, wherein the first sensor data comprises radar data and the method further comprises setting a height identified by the radar data to equal a location relative to an ROI identified by the object detection.

9. The method of claim 1, wherein:
the first subset comprises first spatial data associated with a first sensor type;
the second subset comprises second spatial data associated with a second sensor type;
inputting the first subset and the second subset further comprises inputting, along with at least one of the first subset or the second subset, non-spatial data; and
the non-spatial data comprises at least one of:
a monocular depth probability distribution,
a radar cross-section,
doppler,
doppler variance,
signal-to-noise ratio,
range variance,
an object classification associated with the object detection,
an instance segmentation associated with the object detect,
an instance label associated with one or more portions of object detection,
a semantic segmentation associated with the object detection,
a top-down segmentation, or
an orientation of an ROI associated with the object detection.

10. A system comprising:
one or more processors; and
a memory storing processor-executable instructions that, when executed by the one or more processors, cause the system to perform operations comprising:

receiving first sensor data associated with a first type of sensor;

receiving second sensor data associated with a second type of sensor;

receiving an object detection, wherein the object detection identifies an object in one or more images;

inputting, to a first subnetwork, a first subset of the first sensor data;

inputting, to a second subnetwork, a second subset of the second sensor data;

combining, as combined data, a first output of the first subnetwork and a second output of the second subnetwork;

inputting, to a third subnetwork, a first portion of the combined data;

inputting, to a fourth subnetwork, a second portion of the combined data;

receiving, from the third subnetwork, a first map indicating at least a first probability that a first point of the first sensor data is associated with the object;

receiving, from the fourth subnetwork, a second map indicating at least a second probability that a second point of the second sensor data is associated with the object; and determining, based at least in part on at least one of the first map or the second map, a three-dimensional region of interest.

11. The system of claim 10, wherein determining the three-dimensional region of interest comprises:

inputting, to an ROI machine-learning model, at least one of the first map or the second map and at least a portion of the object detection; and receiving, from the ROI machine-learning model, the three-dimensional region of interest.

12. The system of claim 11, wherein the operations further comprise:

determining, from among a first plurality of points of the first map and a second plurality of points of the second map, a set of points that are associated with probabilities that meet or exceed a probability threshold, wherein the set of points lie within the three-dimensional region of interest;

determining at least one of:
an average probability of the probabilities associated with the set of points,
an angle of uncertainty associated with the set of points, or
a variance of a distribution function over the average probability and the angle of uncertainty; and outputting the three-dimensional region of interest based at least in part on determining that at least one of the average probability meets or exceeds an average probability threshold, the angle of uncertainty is less than an uncertainty threshold, or the variance is less than a variance threshold.

13. The system of claim 10, wherein the first sensor data is associated with a radar sensor and the second sensor data is associated with a lidar sensor.

14. The system of claim 13, wherein the operations further comprise:

projecting, as first projected data, the first sensor data into an image space associated with an image sensor that captured at least one of the one or more images, wherein the projecting is based at least in part on at least one of an orientation of the image sensor;

projecting, as second projected data and based at least in part on the orientation, the second sensor data into the image space;

determining first points of the first sensor data associated with a first portion of the first projected data that lies within extents of the object detection;

determining second points of the second sensor data associated with a second portion of the second projected data that lies within extents of the object detection;

determining, as the first subset, the first points from a first coordinate space associated with the first type of sensor to a coordinate space defined as having an origin located at a position of the image sensor and a longitudinal axis extending through a center of an ROI associated with the object detection; and determining, as the second subset, the second points from a second coordinate space associated with the second type of sensor to the coordinate space defined as having an origin located at a position of the image sensor.

15. The system of claim 10, wherein combining the first output and the second output comprises:

down-sampling, as first global data and using one or more first network layers, the first output;

down-sampling, as second global data and using one or more network second layers, the second output;

concatenating, as concatenated data, the first global data with the second global data;

inputting the concatenated data into a first fully-connected layer and a second fully-connected layer;

receiving first transformed concatenated data from the first fully-connected layer and second transformed concatenated data from the second fully-connected layer;

adding, as first summed data, the first output with the first transformed concatenated data; and adding, as second summed data, the second output with the second transformed concatenated data.

16. The system of claim 10, wherein at least one of:

the first subnetwork has a substantially similar first architecture as the second subnetwork, the first subnetwork associated with first parameters which differ from second parameters associated with the second subnetwork; or the third subnetwork has a substantially similar second architecture as the fourth subnetwork, the third subnetwork associated with third parameters which differ from fourth parameters associated with the fourth subnetwork.

17. The system of claim 10, wherein the indication comprises at least one of a region of interest of an image, an orientation associated with the region of interest, an object classification associated with the region of interest, or a monocular depth probability associated with the region of interest.

18. The system of claim 10, wherein:

the object detection is a first object detection and the object is a first object;

the operations further comprise receiving a third map associated with a second object detection, the third map comprising the first point associated with a third probability that the third point is associated with a second object different than the first object;

the first probability and the third probability both meet or exceed a threshold probability; and the operations further comprise excluding the first point from association with the first object detection based at least in part on at least one of:

determining that the first point is associated with a first classification and a second classification,
determining that the first point is associated with both the first object detection and the second object detection, or
determining that the first probability is less than the third probability.

19. A non-transitory computer-readable medium storing computer-executable instructions that, when executed by one or more processors, cause a computing device to perform operations comprising:
receiving first sensor data associated with a first type of sensor;
receiving second sensor data associated with a second type of sensor;
receiving an object detection, wherein the object detection identifies an object in one or more images;
inputting, to a first subnetwork, a first subset of the first sensor data;
inputting, to a second subnetwork, a second subset of the second sensor data;
combining, as combined data, a first output of the first subnetwork and a second output of the second subnetwork;
inputting, to a third subnetwork, a first portion of the combined data;
inputting, to a fourth subnetwork, a second portion of the combined data;
receiving, from the third subnetwork, first data indicating at least a first probability that a first point of the first sensor data is associated with the object;
receiving, from the fourth subnetwork, second data indicating at least a second probability that a second point of the second sensor data is associated with the object; and
determining, based at least in part on at least one of the first data or the second data, a three-dimensional region of interest.

20. The non-transitory computer-readable medium of claim 19, wherein determining the three-dimensional region of interest comprises:
inputting, to a machine-learning model, at least one of the first data or the second data and the indication; and
receiving, from the machine-learning model, the three-dimensional region of interest.

21. The non-transitory computer-readable medium of claim 19, wherein the operations further comprise:
determining, from among a first plurality of points of the first data and a second plurality of points of the second data, a set of points that are associated with probabilities that meet or exceed a probability threshold, wherein the set of points lie within the three-dimensional region of interest;
determining at least one of:
an average probability of the probabilities associated with set of points,
an angle of uncertainty associated with the set of points, or
a variance of a distribution function over the average probability and the angle of uncertainty; and
outputting the three-dimensional region of interest based at least in part on determining that at least one of the average probability meets or exceeds an average probability threshold or the variance is less than a variance threshold.

22. The non-transitory computer-readable medium of claim 19, wherein the first sensor data is associated with a radar sensor and the second sensor data is associated with a lidar sensor.

23. The non-transitory computer-readable medium of claim 19, wherein combining the first output and the second output comprises:
down-sampling, as first global data and using one or more first network layers, the first output;
down-sampling, as second global data and using one or more network second layers, the second output;
concatenating, as concatenated data, the first global data with the second global data;
inputting the concatenated data into a first fully-connected layer and a second fully-connected layer;
receiving first transformed concatenated data from the first fully-connected layer and second transformed concatenated data from the second fully-connected layer;
adding, as first summed data, the first output with the first transformed concatenated data; and
adding, as second summed data, the second output with the second transformed concatenated data,
wherein the first portion of combined data comprises an output from the first fully connected layer, and
wherein the second portion of combined data comprises an output from the second fully connected layer.

24. The non-transitory computer-readable medium of claim 19, wherein:
the first subnetwork has a substantially similar first architecture as the second subnetwork, the first subnetwork associated with first parameters which differ from second parameters associated with the second subnetwork; or
the third subnetwork has a substantially similar second architecture as the fourth subnetwork, the third subnetwork associated with third parameters which differ from fourth parameters associated with the fourth subnetwork.

* * * * *